(12) United States Patent
Nakanishi

(10) Patent No.: US 11,656,103 B2
(45) Date of Patent: May 23, 2023

(54) ACTUATOR CONTROL DEVICE AND ACTUATOR CONTROL METHOD

(71) Applicant: DENSO CORPORATION, Kariya (JP)

(72) Inventor: Daisuke Nakanishi, Kariya (JP)

(73) Assignee: DENSO CORPORATION, Kariya (JP)

( * ) Notice: Subject to any disclaimer, the term of this patent is extended or adjusted under 35 U.S.C. 154(b) by 189 days.

(21) Appl. No.: 17/329,930

(22) Filed: May 25, 2021

(65) Prior Publication Data
US 2021/0372826 A1 Dec. 2, 2021

(30) Foreign Application Priority Data
May 26, 2020 (JP) .............................. JP2020-091458

(51) Int. Cl.
| | |
|---|---|
| *B23Q 11/00* | (2006.01) |
| *G01D 5/244* | (2006.01) |
| *H02K 29/08* | (2006.01) |
| *G01D 5/14* | (2006.01) |
| *H02P 6/17* | (2016.01) |
| *H02K 7/116* | (2006.01) |

(52) U.S. Cl.
CPC ......... *G01D 5/24471* (2013.01); *G01D 5/145* (2013.01); *H02K 7/116* (2013.01); *H02K 29/08* (2013.01); *H02P 6/17* (2016.02)

(58) Field of Classification Search
CPC ...... G01D 5/24471; G01D 5/145; H02P 6/17; H02K 7/116; B23Q 11/0092
See application file for complete search history.

(56) References Cited

U.S. PATENT DOCUMENTS

| | | | |
|---|---|---|---|
| 9,751,178 B2 * | 9/2017 | Kameta | ............. B23Q 11/0092 |
| 2014/0379103 A1 * | 12/2014 | Ishikawa | ................. G05D 3/00 |
| | | | 700/56 |

FOREIGN PATENT DOCUMENTS

JP 2008-139108 6/2008

* cited by examiner

*Primary Examiner* — Cortez M Cook
(74) *Attorney, Agent, or Firm* — Nixon & Vanderhye P.C.

(57) ABSTRACT

An actuator control device that controls an actuator according to an angle of a rotating portion includes a processor configured to: calculate a target relative angle from a rotation start angle to a target angle; detect a sensor detection angle from a sensor; calculate an angular velocity of the rotating portion based on a change amount of the sensor detection angle in a predetermined calculation cycle; correct the angular velocity to be closer to a normal angular velocity when the angular velocity is greater than or equal to a first threshold or less than or equal to a second threshold; calculate an actual relative angle by integrating the angular velocity and a corrected angular velocity; and feedback-control the actuator according to a deviation between a target relative angle and the actual relative angle.

6 Claims, 17 Drawing Sheets

US 11,656,103 B2

ACTUATOR CONTROL DEVICE AND ACTUATOR CONTROL METHOD

CROSS REFERENCE TO RELATED APPLICATION

The present application claims the benefit of priority from Japanese Patent Application No. 2020-091458 filed on May 26, 2020. The entire disclosure of the above application is incorporated herein by reference.

TECHNICAL FIELD

The present disclosure relates to an actuator control device that controls the drive of an actuator, and an actuator control method.

BACKGROUND

Conventionally, there is known an actuator control device that feedback-controls an actuator so that the rotation angle of a rotating portion (that is, a gear or a control target) driven by the actuator matches a target rotation angle. In the following description, the rotation angle is simply referred to as "angle". In addition, degree is simply referred to as "deg".

The conceivable sensor detects the angle of a rotating portion, and includes a magnet that rotates with the rotating portion and a Hall IC provided on the outside of the magnet. This sensor is configured so that the output waveform of the Hall element according to the angle of the rotating portion approaches a linear shape (that is, an ideal waveform) by designing the shape of the magnet viewed from the rotation axis direction to be elliptical.

SUMMARY

An actuator control device that controls an actuator according to an angle of a rotating portion includes a processor configured to: calculate a target relative angle from a rotation start angle to a target angle; detect a sensor detection angle from a sensor; calculate an angular velocity of the rotating portion based on a change amount of the sensor detection angle in a predetermined calculation cycle; correct the angular velocity to be closer to a normal angular velocity when the angular velocity is greater than or equal to a first threshold or less than or equal to a second threshold; calculate an actual relative angle by integrating the angular velocity and a corrected angular velocity; and feedback-control the actuator according to a deviation between a target relative angle and the actual relative angle.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
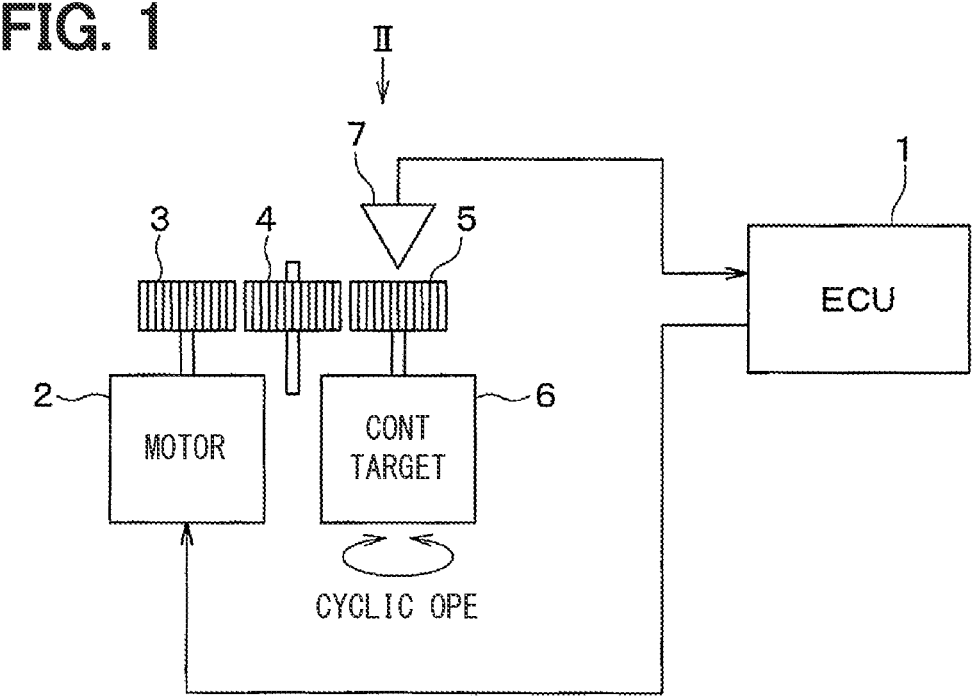
FIG. 1 is a system configuration diagram including an actuator control device according to the first embodiment.

Even with a conceivable sensor, when the rotating portion rotates 360 deg or more, the output value of the sensor may have a range that does not provides a continuity at a place where the direction of the magnetic flux passing through the magneto-sensitive surface of the Hall IC is opposite. The range in which the output value of the sensor does not have continuity is, in other words, the range in which the amount of change in the sensor output value in response to the change in the angle of the rotating portion is reversed, and the range in which the linearity is interrupted in the ideal waveform. In the present specification, the center of the angle range in which the output value of the sensor does not have continuity is referred to as the "reference position". The conceivable sensor has a configuration in which the output value of the sensor does not have continuity when the angle of the rotating portion steps over between 180 deg and −180 deg.

Not limited to the conceivable sensor, in general, a sensor that detects the angle of a rotating portion has a reference position where the output value does not have continuity. Further, in general, in the feedback control of the actuator, the angle for rotating the rotating portion from the rotation start angle to the target angle (hereinafter referred to as "target relative angle") is calculated by an equation of "target relative angle"="target angle"−"the current angle of the rotating part". Therefore, in the feedback control for rotating the rotating portion by 360 deg or more, when the output value of the sensor passes through the reference position, the target relative angle may not be calculated correctly, and the actuator may operate in the opposite direction to the required operation. For example, in a case where a sensor having the reference position at 0 deg (that is, 360 deg) is used, when the rotating portion is at 390 deg, the angle is detected as 30 deg according to the output value of the sensor. Therefore, for example, when calculating the target relative angle for rotating the rotating portion from 350 deg to 390 deg, the correct calculation should be performed by an equation of "target relative angle=390−350 =40", but the calculation may be erroneously performed by an equation of "target relative angle=30−350=−320." In such a case, even if the original requirement is to operate the actuator by 40 deg clockwise, the actuator may operate by 320 deg counterclockwise contrary to the original requirement.

In view of the above points, an actuator control device and an actuator control method are provided to be capable of accurately driving an actuator.

In order to achieve the above object, an actuator control device controls the drive of the actuator according to the angle of the rotating portion (3 to 6) that is rotated by the actuator (2) by 360 deg or more. This actuator control device calculates a target relative angle for rotating the rotating portion from the rotation start angle to the target angle (at S10). Then, the output value from the sensor (7) that outputs the output signal corresponding to the angle of the rotating portion is signal-processed to detect the sensor detection angle as the absolute angle of the rotating portion (at S20 and S30). The angular velocity of the rotating portion is calculated from the amount of change in the sensor detection angle at a predetermined calculation cycle (at S40). Then, when the angular velocity is greater than or equal to the first threshold value set to a predetermined value smaller than 360 deg/sec and larger than zero deg/sec, or when the angular velocity is less than or equal to the second threshold value set to a predetermined value smaller than 0 and greater than −360 deg/sec, correction is performed to approach the angular velocity closer to the normal angular velocity (at S50 and S60 to S64). Then, by integrating the angular velocity calculated in the predetermined calculation cycle and the corrected angular velocity, the actual relative angle to which the rotating portion is rotated from the rotation start angle is calculated (at S90), and the drive of the actuator is feedback-controlled according to the deviation between the target relative angle and the actual relative angle (at S100, S110).

As a result, when the output value of the sensor crosses the center of the angular range having no continuity (hereinafter referred to as "a reference position"), the correction is performed to bring the angular velocity closer to the normal angular velocity. Then, by using the corrected angular velocity for the integration of the angular velocity calculated in the predetermined calculation cycle, the actual relative angle can be continuously and accurately calculated even when the output value of the sensor passes through the reference position. Therefore, this actuator control device can accurately perform feedback control of the actuator.

An actuator control method is provided for controlling the drive of the actuator according to the angle of the rotating portion (3 to 6) which is rotated by the actuator (2) for 360 deg or more. This actuator control method includes the following process. That is, the target relative angle for rotating the rotating portion from the rotation start angle to the target angle is calculated (at S10). Then, the output value from the sensor (7) that outputs the output signal corresponding to the angle of the rotating portion is signal-processed to detect the sensor detection angle as the absolute angle of the rotating portion (at S20 and S30). The angular velocity of the rotating portion is calculated from the amount of change in the sensor detection angle at a predetermined calculation cycle (at S40). Then, when the angular velocity is greater than or equal to the first threshold value set to a predetermined value smaller than 360 deg/sec and larger than zero deg/sec, or when the angular velocity is less than or equal to the second threshold value set to a predetermined value smaller than 0 and greater than −360 deg/sec, correction is performed to approach the angular velocity closer to the normal angular velocity (at S50 and S60 to S64). Then, by integrating the angular velocity calculated in the predetermined calculation cycle and the corrected angular velocity, the actual relative angle to which the rotating portion is rotated from the rotation start angle is calculated (at S90), and the drive of the actuator is controlled according to the deviation between the target relative angle and the actual relative angle (at S100, S110).

As a result, the actuator control method also has the same effect as that of the actuator control device described above.

The reference numerals in parentheses attached to the components and the like indicate an example of correspondence between the components and the like and specific components and the like described in an embodiment to be described below.

Hereinafter, a plurality of embodiments of the present disclosure will be described with reference to the drawings. In the following embodiments, the same or equivalent parts are denoted by the same reference numerals as each other, and explanations will be provided to the same reference numerals.

First Embodiment

A first embodiment will be described with reference to the drawings. As shown in FIG. 1, the actuator control device 1 of the present embodiment feedback-controls the actuator 2 according to the angle of a rotating portion that rotates by the torque of the actuator 2. In the following description, the actuator control device 1 is referred to as an ECU 1 (ECU is an abbreviation for Electronic Control Unit).

The actuator 2 shown in FIG. 1 is, for example, an electric motor. The torque of the actuator 2 is transmitted from the motor gear 3 connected to the shaft of the actuator 2 in the order of the intermediate gear 4 and the output gear 5. As a result, the controlled target 6 connected to the output gear 5 rotates. In FIG. 1, the three gears 3, 4, and 5 are described separately for easy viewing, but in reality, the three gears 3, 4, and 5 are engaged with each other. The number of gears for transmitting torque from the actuator 2 to the control target 6 is not limited to three, and may be set arbitrarily. The controlled target 6 rotates by 360 deg or more by driving the actuator 2. As such a control target 6, for example, there is a shift drum used in a vehicle transmission system. The control target 6 is not limited to this, and various objects that rotate for 360 deg or more may be applied.

In the present embodiment, the angles of the output gear 5 and the control target 6 are detected by the sensor 7. In the present embodiment, the output gear 5 and the controlled object 6 correspond to an example of the "rotating portion". As will be described later in the embodiment, the motor gear 3 or the intermediate gear 4 may correspond to an example of the "rotating portion".

Figure 2:
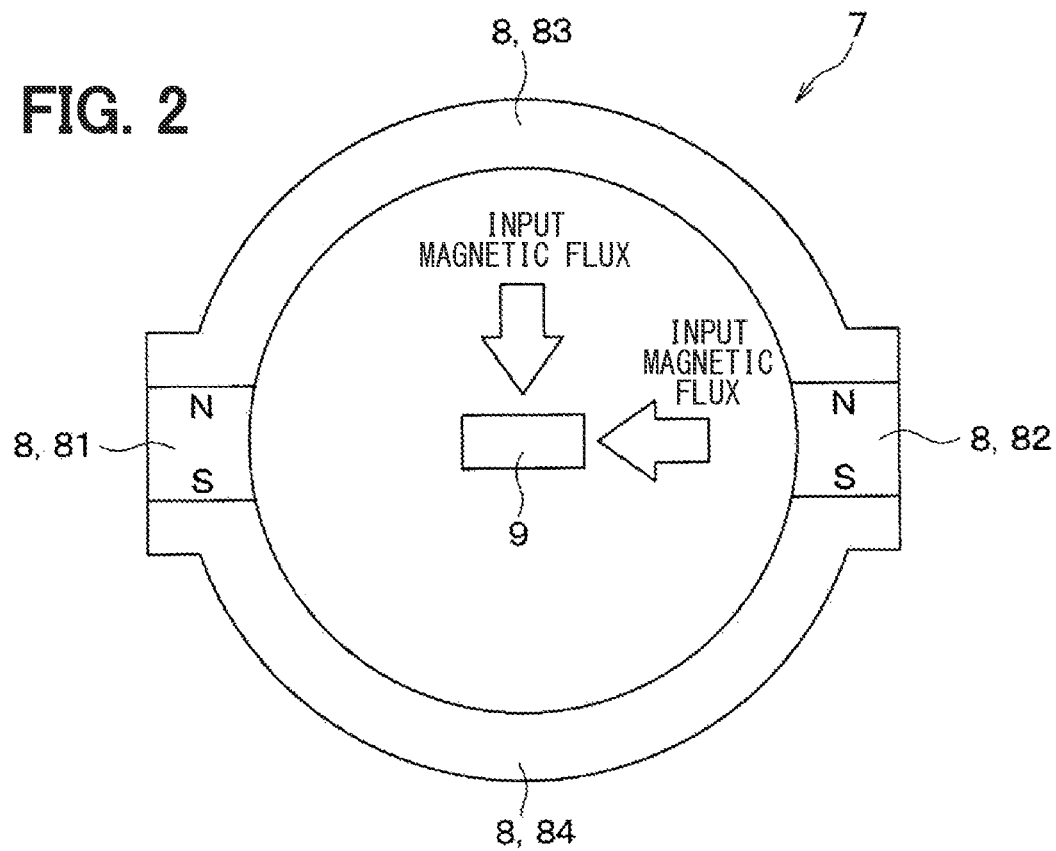
FIG. 2 is a schematic view of the sensor viewed from the II direction of FIG. 1.

FIG. 2 shows an example of the configuration of the sensor 7. As shown in FIG. 2, the sensor 7 has a magnetic field formation unit 8 that rotates together with the output gear 5 and a magnetic field detector 9 provided disposed inside the magnetic field formation unit 8. The magnetic field formation unit 8 includes a first magnet 81 and a second magnet 82 which are arranged at positions facing each other with the center of rotation interposed therebetween, and the first yoke 83 and the second yoke 84 connecting the first magnet 81 and the second magnet 82. The first yoke 83 connects the N pole of the first magnet 81 and the N pole of the second magnet 82. The second yoke 84 connects the S pole of the first magnet 81 and the S pole of the second magnet 82. On the other hand, the magnetic field detector 9 has two Hall ICs (not shown) and is fixed to a housing cover (not shown) or the like. The two Hall ICs each detect the magnitudes of the orthogonal magnetic flux densities in the closed magnetic path formed by the magnetic field formation unit 8, respectively. In other words, the two Hall ICs are provided so that the magnetically sensitive surface of one Hall IC and the magnetically sensitive surface of the other Hall IC are orthogonal to each other. The output signals output from the two Hall ICs (hereinafter referred to as the output values of the sensor 7) are input to the ECU 1.

Figure 3:
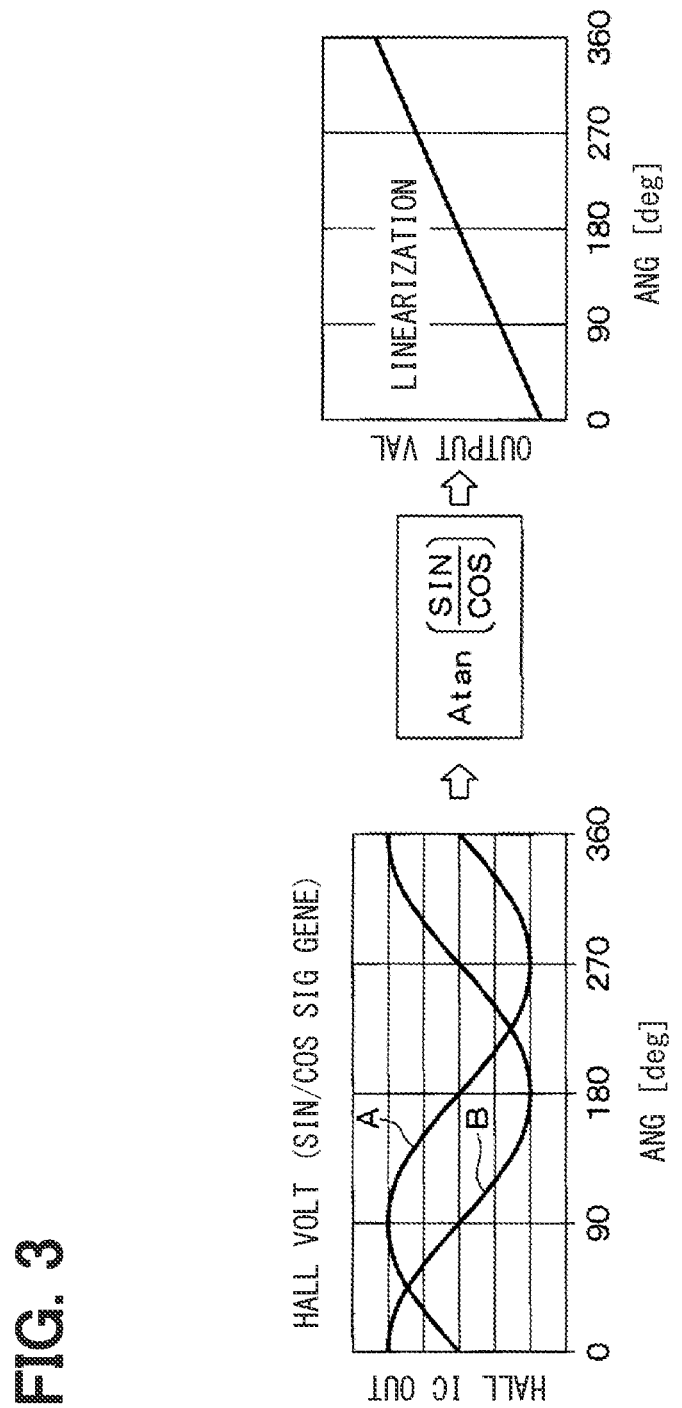
FIG. 3 is a graph showing the output characteristics of the sensor.

In FIG. 3, the output from one Hall IC is shown by the solid line A, and the output from the other Hall IC is shown by the solid line B. The ECU 1 converts the output from one Hall IC to a sine component and the output from the other Hall IC to a cosine component to perform angle conversion by Arc tangent calculation. As a result, the output value of the sensor 7 changes linearly from 0 deg to 360 deg of the angle of the rotating portion. Further, by using two Hall ICs in this sensor 7, the temperature characteristic of the magnet can be canceled in principle by division.

Figure 4:
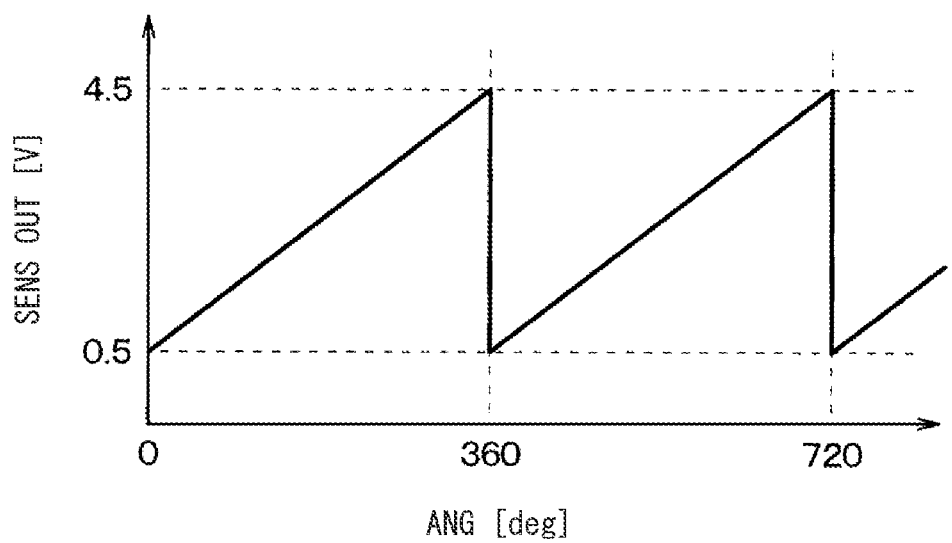
FIG. 4 is a graph showing the relationship between the angle of the rotating portion and the output value of the sensor.

As shown in FIG. 4, the output value of the sensor 7 changes substantially linearly from the minimum value (for example, 0.5 V) to the maximum value (for example, 4.5 V) when the angle of the rotating portion is changed from 0 deg to 360 deg. Then, every time the rotating portion rotates 360 deg (that is, 360 deg, 720 deg, 1080 deg and so on), it returns to the minimum value. That is, the output value of the sensor 7 has an angle range that does not have continuity every time the angle of the rotating portion is added by 360 deg (in other words, the amount of change in the sensor output value according to the angle change of the rotating portion is reversed, and the range where the linearity is interrupted exists). In the present specification, the center of the angle range in which the output value of the sensor 7 does not have continuity is referred to as the "reference position".

Figure 5:
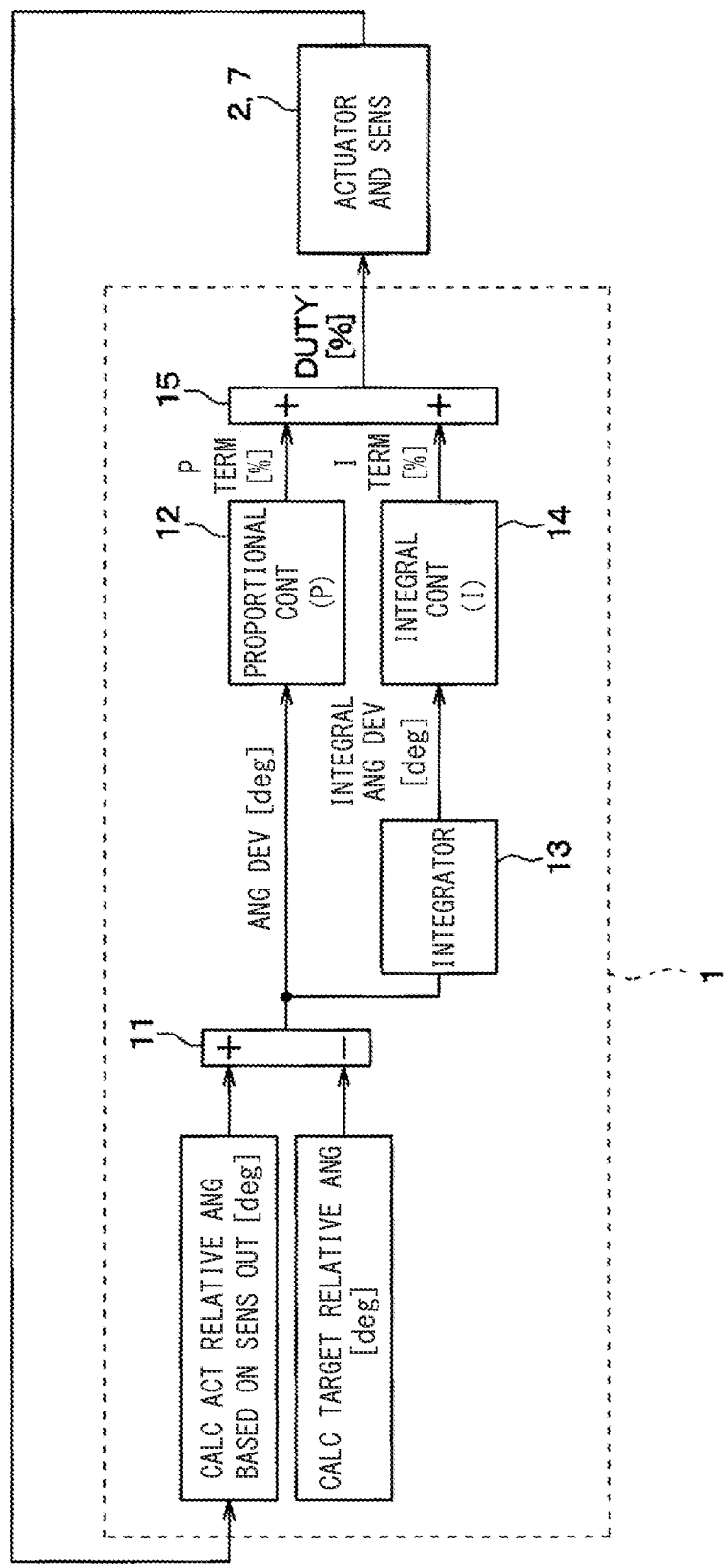
FIG. 5 is an explanatory diagram of feedback control executed by the actuator control device.

The ECU 1 feedback-controls the actuator 2 so that the actual relative angle of the rotating portion detected by the sensor output and the target relative angle match. FIG. 5 is an explanatory diagram for explaining PI control as an example of feedback control executed by ECU 1.

As shown in FIG. 5, an output signal from the sensor 7 that detects the angle of the rotating portion rotated by the actuator 2 is input to the ECU 1. The ECU 1 calculates the actual relative angle of the rotating portion based on the output value of the sensor 7. Further, the ECU 1 calculates the target relative angle of the rotating portion. The calculation method of the actual relative angle and the target relative angle will be described later.

The ECU 1 calculates the angle deviation between the actual relative angle of the rotating portion and the target relative angle by the subtractor 11. Then, the proportional controller 12 calculates the P term according to the angle deviation. Further, the integrator 13 calculates the integration angle deviation, and the integrator controller 14 calculates the I term. Then, the P term and the I term are added by the adder 15, the duty ratio of the current supplied to the actuator 2 is calculated, and the actuator 2 is driven and controlled.

Subsequently, the actuator control method executed by the ECU 1 of the present embodiment will be described with reference to the flowchart of FIG. 6, the time charts of FIGS. 7A to 7D, the time charts of FIGS. 8A to 8C, and the explanatory diagram of FIG. 9.

FIGS. 7A to 7D referred to in the description of the actuator control method show an example of control of the actuator 2. In FIGS. 7A to 7D, at time T0, the rotating portion starts rotating from the rotation start angle of 0 deg toward the first target angle of 500 deg, and at time T2, the rotating portion reaches the first target angle of 500 deg. Then, the target angle is changed to 0 deg at the time T2, the rotating portion starts rotating again, and the rotating portion reaches the changed target angle of 0 deg at the time T4.

Figure 6:
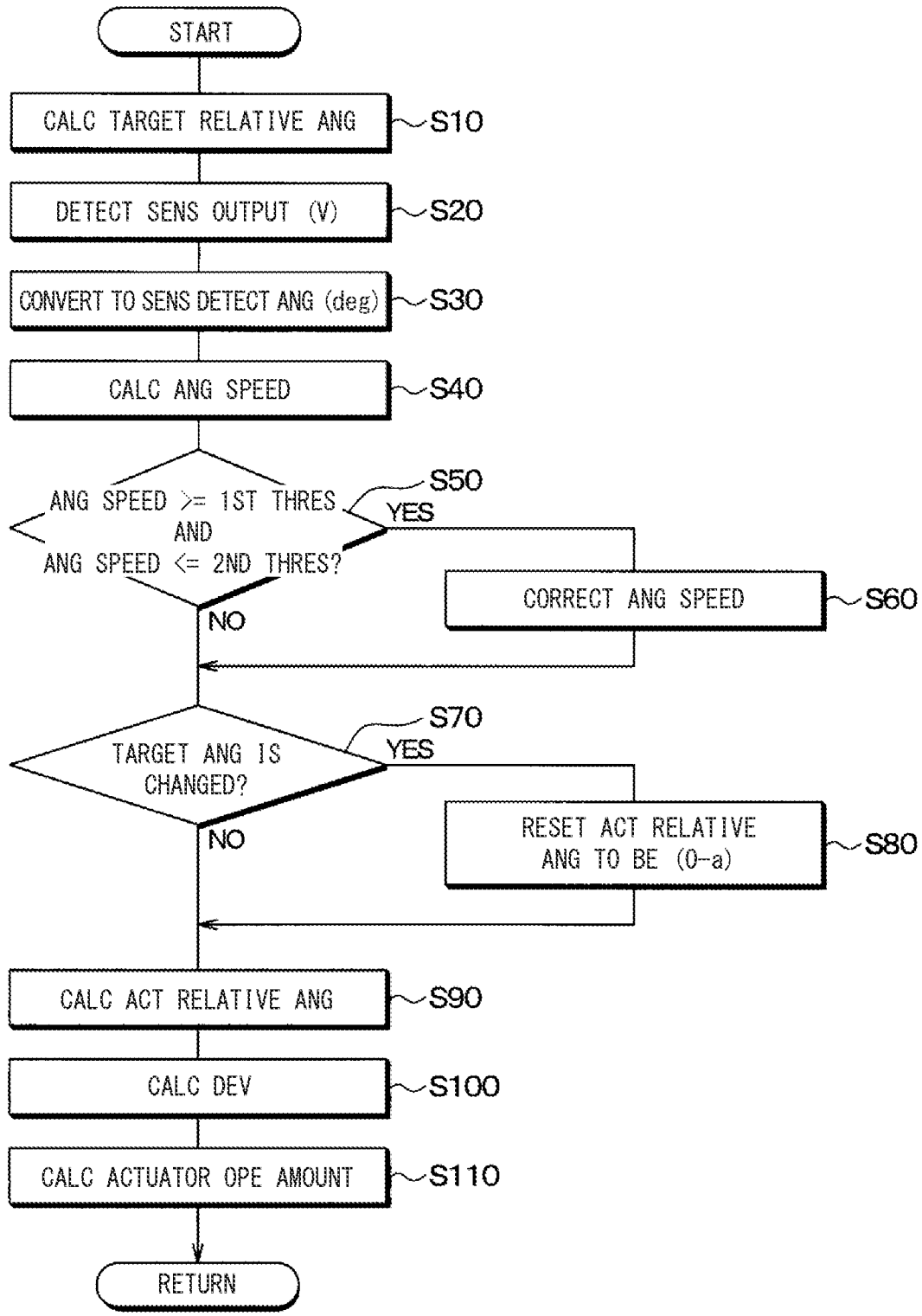
FIG. 6 is a flowchart of an actuator control method according to the first embodiment.
Figure 7A:
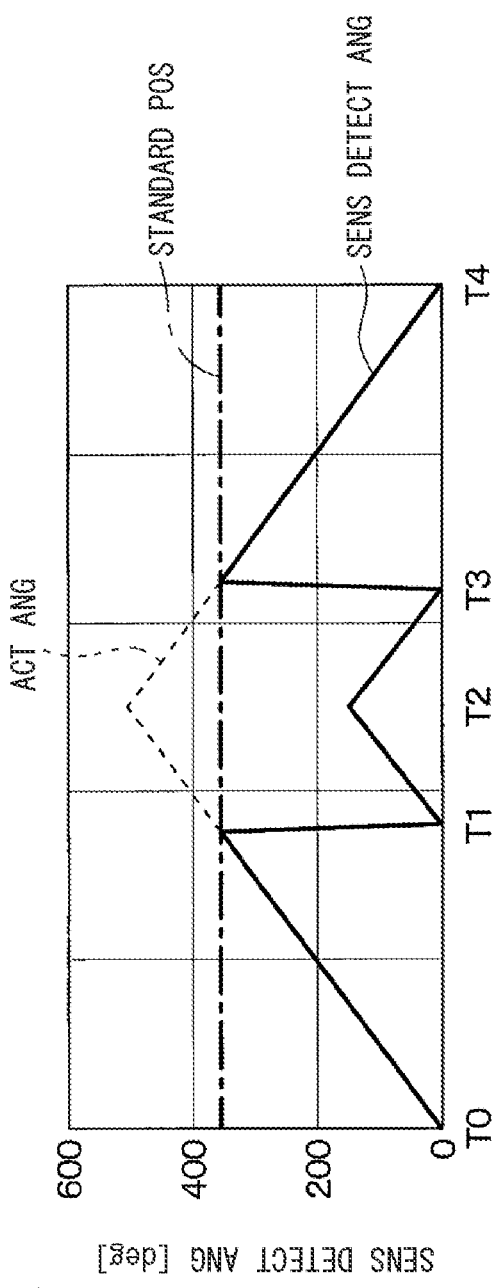
FIG. 7A is a time chart showing an actual angle of a rotating portion and a sensor detection angle.
Figure 7B:
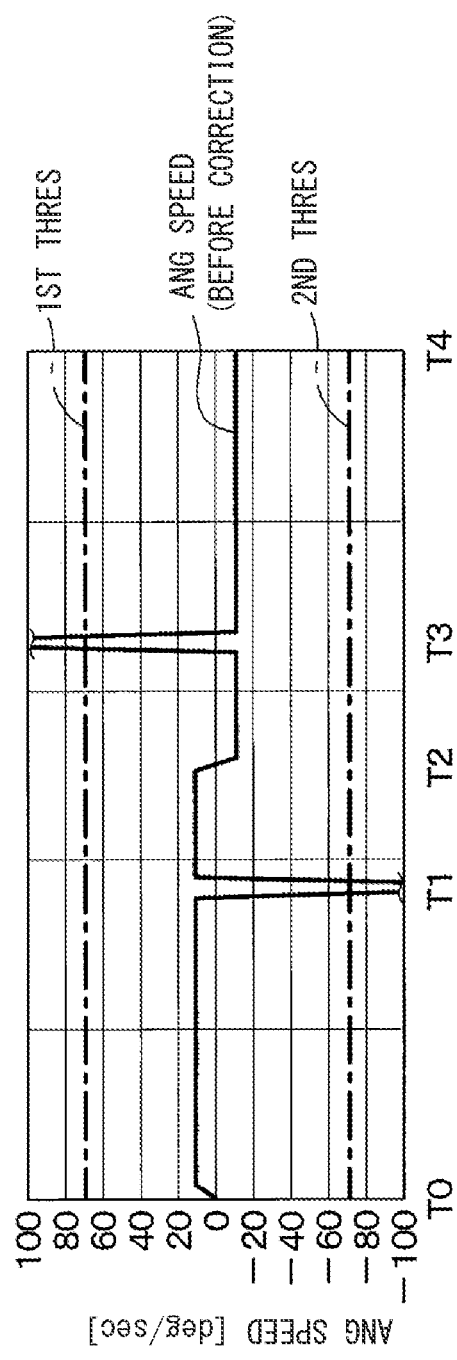
FIG. 7B is a time chart showing the angular velocity of the rotating portion calculated from the sensor detection angle.
Figure 7C:
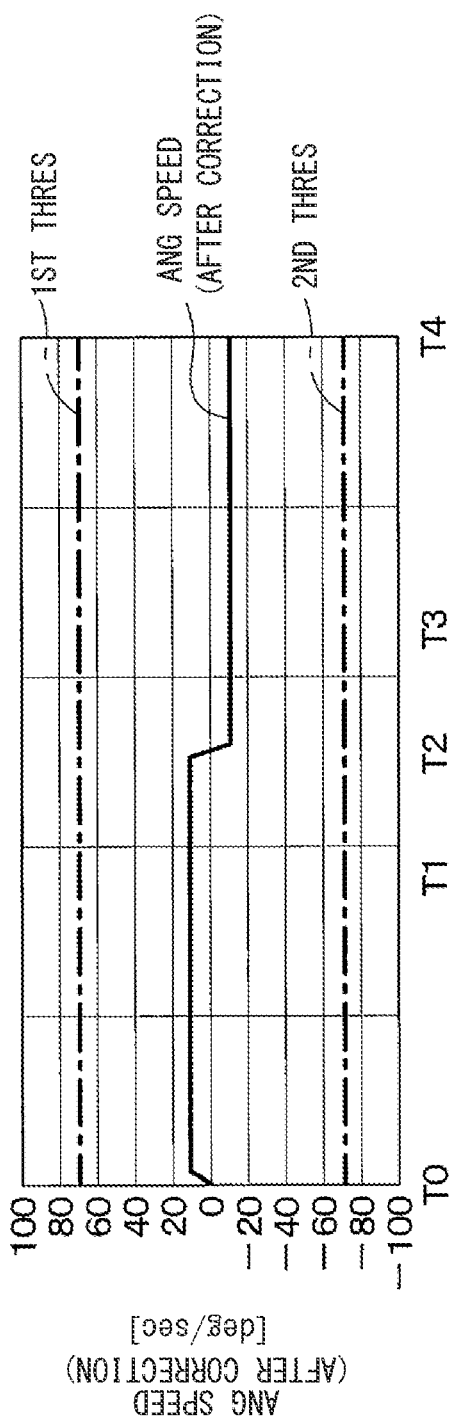
FIG. 7C is a time chart showing the corrected angular velocity.

In the flowchart shown in FIG. 6, first, in step S10, the ECU 1 calculates the target relative angle. The target relative angle is an angle for rotating the rotating portion from the rotation start angle to the target angle. The target relative angle is calculated as the deviation between the target angle before the target angle is changed and the target angle after the target angle is changed. That is calculated by an equation of "target relative angle"="target angle after change"−"target angle before change". The target angle is an absolute angle with respect to a predetermined position in the rotating portion as a reference position, and may be set at a value exceeding 360 deg.

Figure 7D:
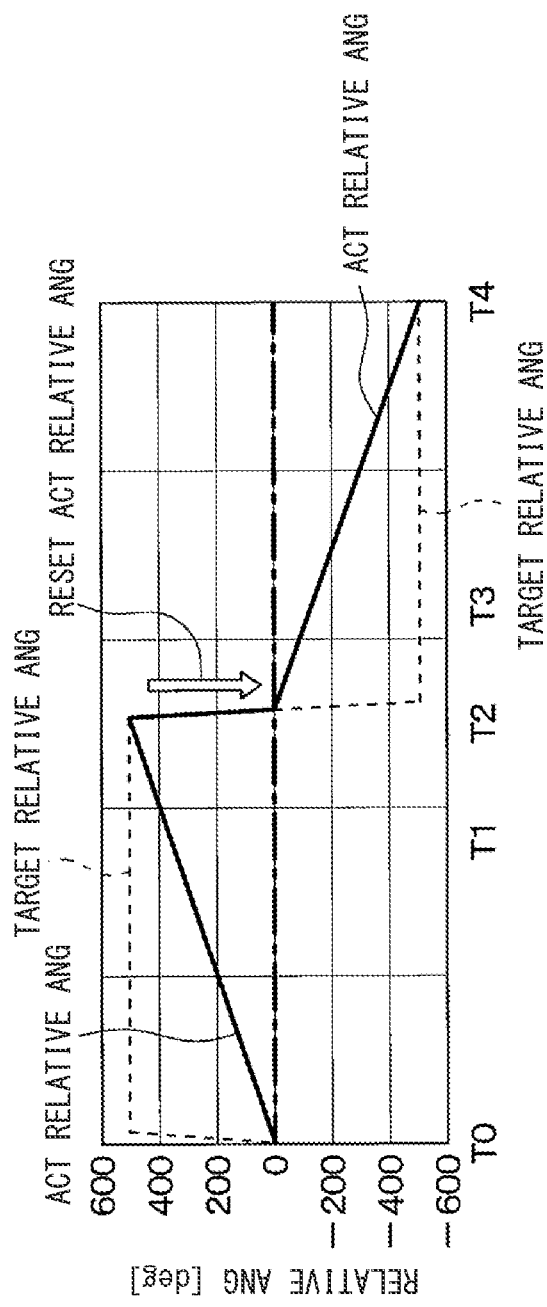
FIG. 7D is a time chart showing an actual relative angle and a target relative angle of the rotating portion.

In the time chart of FIG. 7D, the target relative angle is shown by a broken line. At time T0, the target angle is set to 500 deg. Here, the target angle before the time T0 is set to 0 deg. Therefore, as shown by the broken line in FIG. 7D, the target relative angle is set to 500 deg at time T0. That is calculated by an equation of "target angle of 500 deg after change"−"target angle of 0 deg before change"="target relative angle of 500 deg".

Further, the target angle is changed to 0 deg at time T2. Therefore, at time T2, the target relative angle is set to −500 deg. That is calculated by an equation of "target angle of 0 deg after change"−"target angle of 500 deg before change"="target relative angle of −500 deg".

Next, in step S20 of FIG. 6, the ECU 1 detects an output value [V] from the sensor 7 that outputs a voltage signal according to the angle of the rotating portion. As described with reference to FIG. 4, the output value of the sensor 7 changes substantially linearly from the minimum value to the maximum value when the angle of the rotating portion changes from 0 deg to 360 deg. Then, every time the rotating portion rotates from 0 to 360 deg, it returns to the minimum value.

Subsequently, in step S30 of FIG. 6, the ECU 1 detects the sensor detection angle θ [deg] by performing signal processing including AD conversion on the output value from the sensor 7. The sensor detection angle is an absolute angle of the rotating portion detected by signal processing the output value of the sensor 7, and is detected every predetermined calculation cycle (for example, every several milliseconds).

In the time chart of FIG. 7A, the actual angle of the rotating portion is shown by a broken line, and the sensor detection angle is shown by a solid line. The actual angle of the rotating portion changes from 0 deg to 500 deg from time T0 to time T2 as the rotating portion rotates. Further, it changes from 500 deg to 0 deg from the time T2 to the time T4.

On the other hand, since the sensor detection angle is detected by signal processing the output value of the sensor 7, the output value of the sensor 7 becomes 0 deg every time the output value of the sensor 7 passes through the reference position. Therefore, the sensor detection angle changes from 360 deg to 0 deg at the time T1 when the output value of the sensor 7 passes through the reference position. Further, the sensor detection angle changes from 0 deg to 360 deg at the time T3 when the output value of the sensor 7 passes through the reference position.

Next, in step S40 of FIG. 6, the ECU 1 calculates the angular velocity [deg/s] of the rotating portion by time-differentiating (i.e., dθ/dt) the amount of change in the sensor detection angle. Specifically, the ECU 1 can detect the angular velocity of the rotating portion by subtracting the sensor detection angle (that is, θ previous value) detected one calculation cycle before from the predetermined sensor detection angle θ. That is calculated by an equation of dθ/dt ="θ"−"θ previous value". The angular velocity is also calculated every predetermined calculation cycle (for example, several milliseconds), similar to the sensor detection angle.

The time chart of FIG. 7B shows the angular velocity of the rotating portion calculated by time-differentiating the amount of change in the sensor detection angle. In FIG. 7B, at time T1, the angular velocity sharply decreases. Further, even at time T3, the angular velocity is rapidly increasing. This is because, as shown in FIG. 7A, the sensor detection angle, which is the basis for calculating the angular velocity, changes significantly between the time T1 and the time T3.

Next, in step S50 of FIG. 6, the ECU 1 determines whether the angular velocity is equal to or higher than the first threshold value or the angular velocity is equal to or lower than the second threshold value. The first threshold is set to a predetermined value greater than 0 and less than 360 [deg/s]. On the other hand, the second threshold value is set to a predetermined value smaller than 0 and larger than −360 [deg/s]. The first threshold value and the second threshold value are set in a range of angular velocities that cannot be in the practical range, depending on the output of the actuator 2, the gear ratio, and the like. In FIG. 7B, the first threshold is set to, for example, 70 deg/s, and the second threshold is set to, for example, −70 deg/s.

In the determination of step S50 of FIG. 6, when the angular velocity is equal to or higher than the first threshold value or when the angular velocity is equal to or lower than the second threshold value (that is, when the positive determination is made in step S50), the process proceeds to step S60.

In step S60, the ECU 1 corrects the angular velocity so that it approaches the normal angular velocity. In the first embodiment, as a correction for bringing the angular velocity closer to the normal angular velocity, when the angular velocity is equal to or higher than the first threshold value, the angular velocity equal to or higher than the first threshold value is corrected by subtracting 360 [deg/s]. As a result, it is possible to bring the angular velocity equal to or higher than the first threshold value closer to the normal angular velocity.

On the other hand, when the angular velocity is equal to or less than the second threshold value, the angular velocity equal to or less than the second threshold value is corrected by adding 360 [deg/s]. As a result, it is possible to bring the angular velocity equal to or smaller than the second threshold value closer to the normal angular velocity.

On the other hand, in the determination of step S50, when the angular velocity is smaller than the first threshold value or when the angular velocity is larger than the second threshold value (that is, when the negative determination is made in step S50), the angular velocity is processed as a normal angular velocity.

The time chart of FIG. 7C shows the corrected angular velocity. The corrected angular velocity shows a substantially constant value at, for example, 10 deg/s from time T0 to time T2, and shows a substantially constant value at, for example, −10 deg/s from time T2 to time T4.

In the case of a negative determination in step S50 of FIG. 6, and after performing the correction process of step S60, the process proceeds to step S70.

In step S70, the ECU 1 determines whether or not the target angle has been changed while the rotating portion is rotating toward the target relative angle. When the target angle has been changed in the determination in step S70 (that is, in the case of an affirmative determination in step S70), the process proceeds to step S80. The process of step S80 will be described later.

On the other hand, when the target angle have not been changed in the determination in step S70 (that is, in the case of a negative determination in step S70), the process proceeds to step S90.

In step S90, the ECU 1 calculates the actual relative angle. The actual relative angle is the angle at which the rotating portion rotates relative to the rotation start angle. The actual relative angle is calculated by integrating the angular velocity. Specifically, the ECU 1 calculates the actual relative angle by integrating the angular velocity calculated every predetermined calculation cycle (for example, several milliseconds) and the corrected angular velocity.

Subsequently, in step S100, the ECU 1 calculates the deviation between the actual relative angle of the rotating portion and the target relative angle. Then, in step S110, the ECU 1 calculates the operation amount of the actuator 2 and feedback-controls the drive of the actuator 2. The processes of steps S100 and S110 correspond to an example of feedback control described with reference to FIG. 5.

In the time chart of FIG. 7D, the actual relative angle of the rotating portion is indicated by a solid line, and the target relative angle is indicated by a broken line. The actual relative angle of the rotating portion gradually increases from 0 deg from time T0 to time T2, and coincides with the initial target relative angle of 500 deg at time T2. Then, at time T2, the target relative angle is changed to −500 deg. If the target angle is changed after the actual relative angle and the target relative angle match, the actual relative angle is reset to 0 deg. The actual relative angle of the rotating portion gradually decreases from 0 deg from time T2 to time T4, and coincides with the changed target relative angle of −500 deg at time T4.

Next, the process of step S80 of FIG. 6 described above will be described.

The ECU 1 resets the actual relative angle to (0−a) when the target angle is changed while the rotating portion is rotating toward the target relative angle (that is, when a positive determination is made in step S70).

Here, a is an angle deviation calculated by an equation of "target relative angle before change"−"actual relative angle at the time when the target angle is changed".

That is calculated by an equation of "actual relative angle after reset"=0−("target relative angle before change"−"actual relative angle at the time when the target angle is changed"). When this formula is expanded, an equation of "actual relative angle after reset"="actual relative angle at the time when the target angle is changed"−"target relative angle before change" is obtained. Therefore, when the target angle is changed while the rotating portion is rotating toward the target relative angle, the ECU 1 resets the actual relative angle to the value obtained by subtracting "the target relative angle before the change" from "the actual relative angle at the time when the target angle is changed". The reason will be described with reference to FIGS. 8A to 8C and FIG. 9.

Figure 8A:
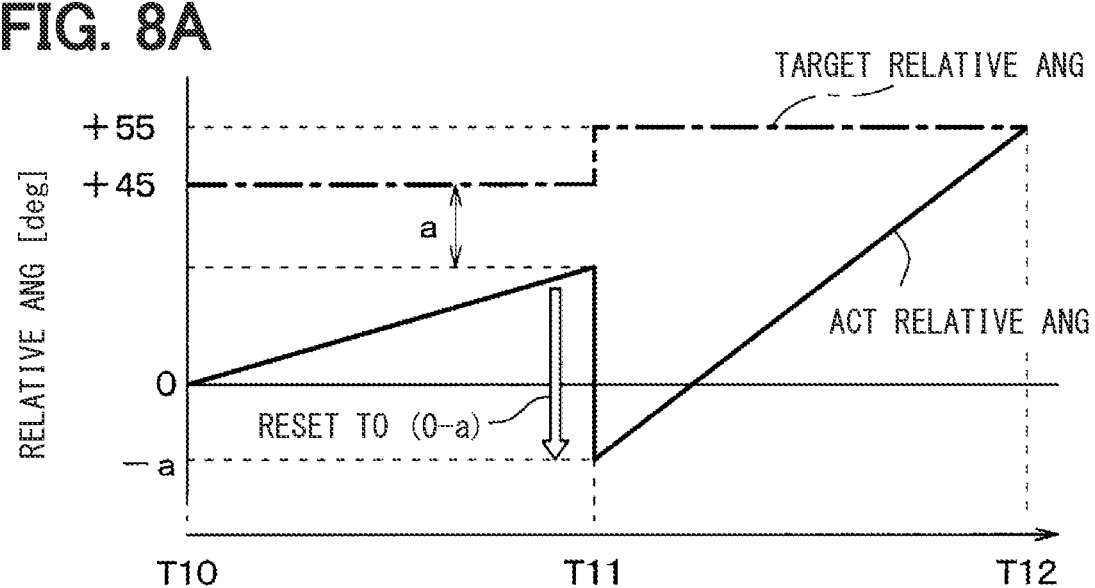
FIG. 8A is a time chart showing an actual relative angle and a target relative angle of a rotating portion in an example of the first embodiment.
Figure 8B:
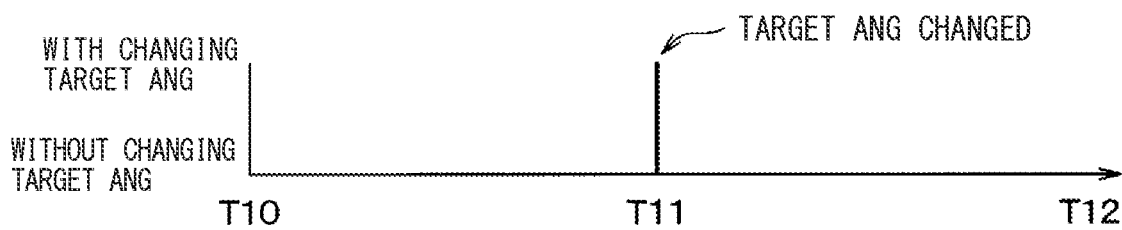
FIG. 8B is a time chart showing a change timing of a target angle in an example of the first embodiment.

In the time chart of FIG. 8A, the target relative angle of the rotating portion is indicated by a chain line, and the actual relative angle is indicated by a solid line. In FIG. 8A, it is assumed that the target angle before the time T10 is 0 deg, the target angle is set to 45 deg at the time T10, and the target angle is changed to 100 deg at the time T11. Therefore, as shown by the chain line in FIG. 8A, the initial target relative angle is set to 45−0=45 [deg] at time T10, and the changed target relative angle is set to 100−45=55 [deg] at time T11. Therefore, the target relative angle is 45 deg from the time T10 to the time T11 and 55 deg from the time T11 to the time T12.

After the time T10, the rotating unit is rotating from the rotation start angle of 0 deg to the initial target relative angle of 45 deg, but the target angle is changed at the time T11 in the middle of the rotation operation. Therefore, the actual relative angle of the rotating portion has not reached the first target relative angle of 45 deg at time T11. At that time T11, the angle deviation obtained by subtracting the "actual relative angle at the time T11 when the target angle is changed" from the "initial target relative angle of 45 deg" is shown as a double-headed arrow a in FIG. 8A.

As described above, the ECU 1 resets the actual relative angle to be (0−a) when the target angle is changed while the rotating portion is rotating toward the initial target relative angle of 45 deg. The time chart of FIG. 8B shows that the target angle is changed at time T11. Therefore, in the time chart of FIG. 8A, the actual relative angle of the rotating portion is reset to be—a at time T11. Then, the actual relative angle of the rotating portion gradually increases from—a reset at time T11 toward the changed target relative angle of 55 deg, and reaches the changed target relative angle of 55 deg at time T12.

Figure 8C:
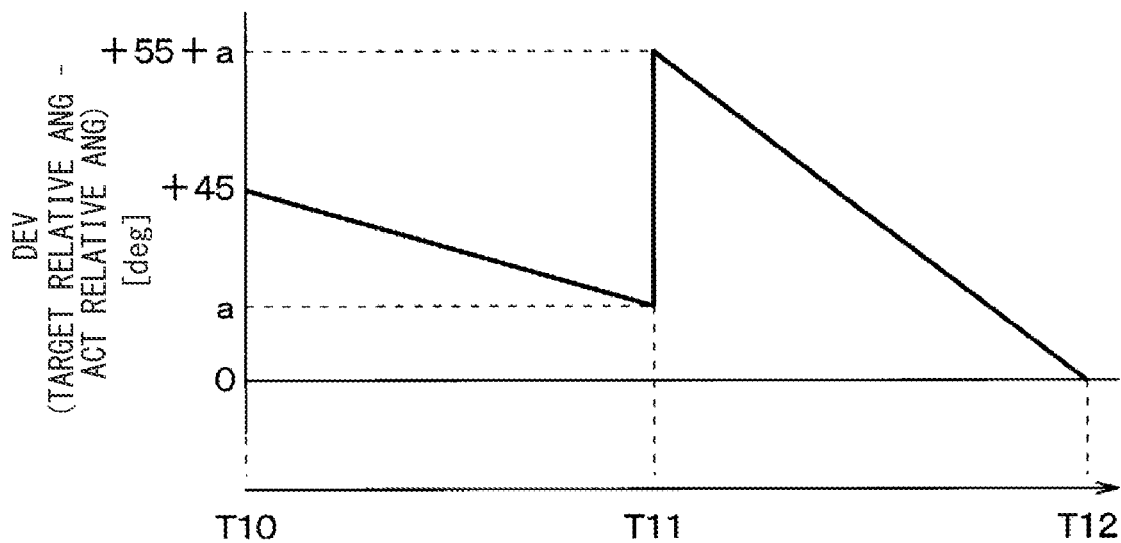
FIG. 8C is a time chart showing a deviation between a target relative angle and an actual relative angle in an example of the first embodiment.

The time chart of FIG. 8C shows the deviation between the target relative angle and the actual relative angle (that is calculated by an equation of "target relative angle"−"actual relative angle"). At time T10, the deviation is 45 deg. After time T11, the deviation gradually decreases. Then, at the time T11 when the target angle is changed, the deviation is changed from a to (55+a). After that, the deviation gradually decreases and becomes 0 at time T12.

Figure 9:
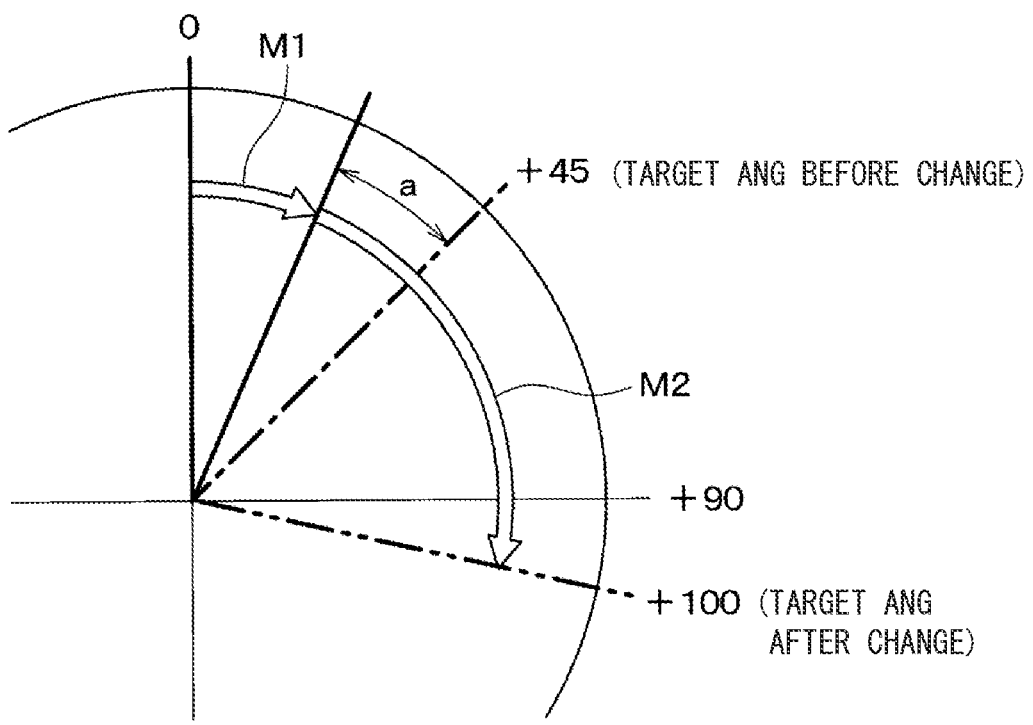
FIG. 9 is an explanatory diagram for explaining the operation of the rotating portion before and after changing the target angle in an example of the first embodiment.

FIG. 9 is a schematic diagram showing the actual operation of the rotating portion based on the control described with reference to FIGS. 8A to 8C. The arrow M1 in FIG. 9 indicates the amount of rotation of the rotating portion between the time T10 and the time T11, and the arrow M2 indicates the amount of rotation of the rotating portion between the time T11 and the time T12. As shown by the arrow M1, at time T11, the rotating portion has not reached the initial target angle of 45 deg. Therefore, the ECU 1 performs a process of resetting the actual relative angle to be (0−a) at the time T11. Then, after the time T11, the ECU 1 feedback-controls the rotating portion so that the rotating portion rotates at an angle obtained by combining the remaining deviation of a and the changed target relative angle. Therefore, as shown by the arrow M2, the rotating portion can reach the changed target angle. In this way, when the target angle is changed while the rotating portion is rotating toward the target relative angle, the ECU 1 resets the actual relative angle to be (0−a). Thus, the deviation a at the time when the target angle is changed can be absorbed by feedback control, and the rotating portion can reach the target angle.

In order to compare with the control process executed by the ECU 1 of the first embodiment described above, the control process executed by the ECU of the comparative example will be described.

FIGS. 10A to 10C and 11C are diagrams for explaining the control process executed by the ECU of the comparative example when the target angle is changed while the rotating portion is rotating toward the target relative angle.

The ECU of the comparative example performs a process of resetting the actual relative angle to be 0 when the target angle is changed while the rotating portion is rotating toward the target relative angle.

Figure 10A:
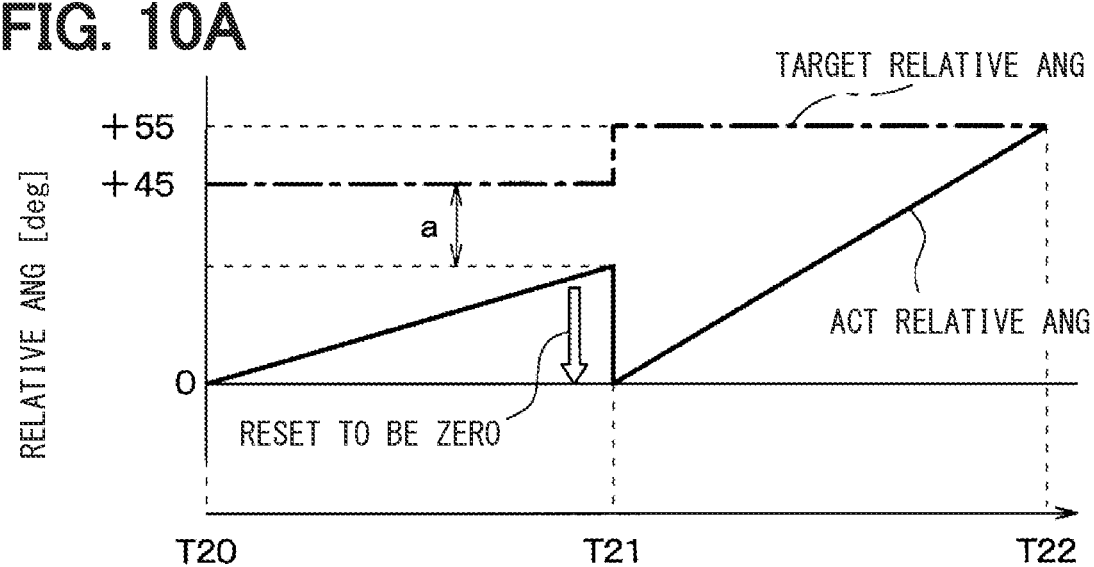
FIG. 10A is a time chart showing an actual relative angle and a target relative angle of a rotating portion in a comparative example.

In the time chart of FIG. 10A, the target relative angle of the rotating portion is indicated by a chain line, and the actual relative angle is indicated by a solid line. In FIG. 10A, it is assumed that the target angle before the time T20 is 0 deg, the target angle is set to 45 deg at the time T20, and the target angle is changed to 100 deg at the time T21. Therefore, as shown by the chain line in FIG. 10A, the initial target relative angle is set to 45 deg at time T20, and the changed target relative angle is set to 55 deg at time T21. Therefore, the target relative angle is 45 deg from the time T20 to the time T21 and 55 deg from the time T21 to the time T22.

Figure 10B:
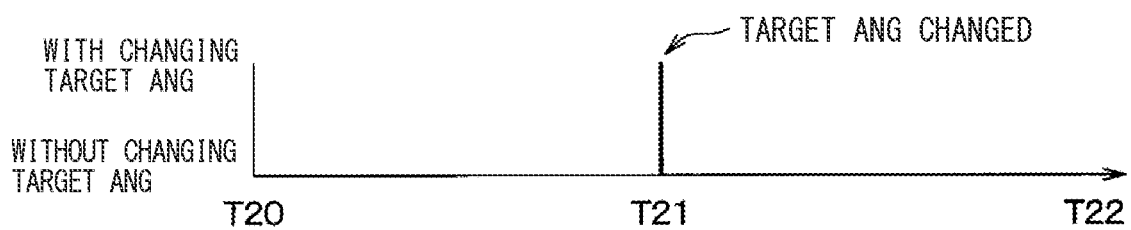
FIG. 10B is a time chart showing a change timing of a target angle in a comparative example.

After the time T20, the rotating unit is rotating from the rotation start angle of 0 deg to the initial target relative angle of 45 deg, but the target angle is changed at the time T21 in the middle of the rotation operation. As described above, the ECU according to the comparison resets the actual relative angle to be 0 when the target angle is changed while the rotating portion is rotating toward the initial target relative angle of 45 deg. The time chart of FIG. 10B shows that the target angle is changed at time T22. Therefore, in the time chart of FIG. 10A, the actual relative angle of the rotating portion is reset to be 0 at time T21. Then, the actual relative angle of the rotating portion gradually increases from 0 reset at time T21 toward the changed target relative angle of 55 deg, and reaches the changed target relative angle of 55 deg at time T22.

Figure 10C:
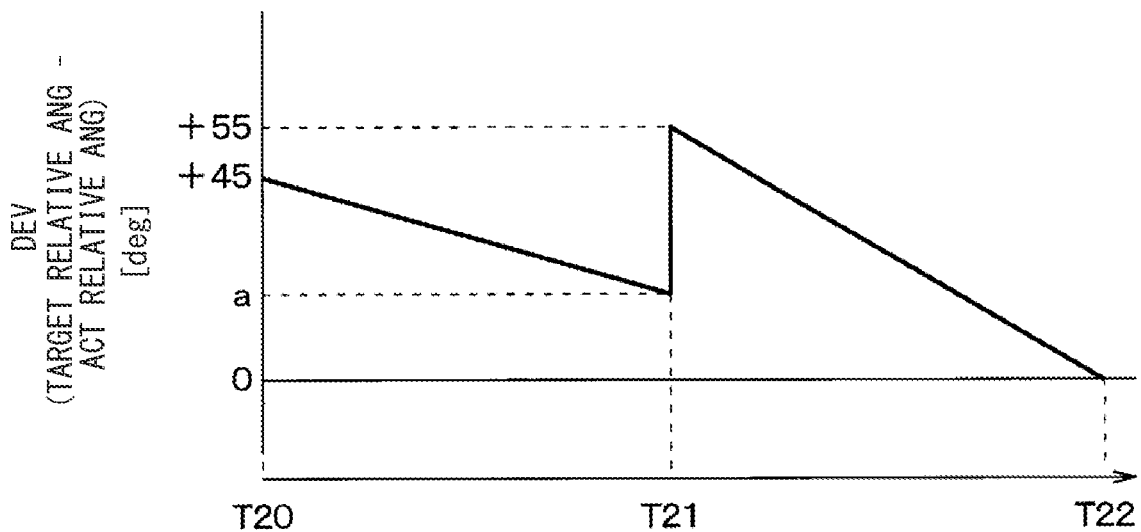
FIG. 10C is a time chart showing a deviation between a target relative angle and an actual relative angle in a comparative example.

The time chart of FIG. 10C shows the deviation between the target relative angle and the actual relative angle (that is calculated by an equation of "target relative angle"−"actual relative angle"). At time T20, the deviation is 45 deg. After time T21, the deviation gradually decreases. Then, at the time T21 when the target angle is changed, the deviation is changed from a to 55 deg. After that, the deviation gradually decreases and becomes 0 at time T22.

Figure 11:
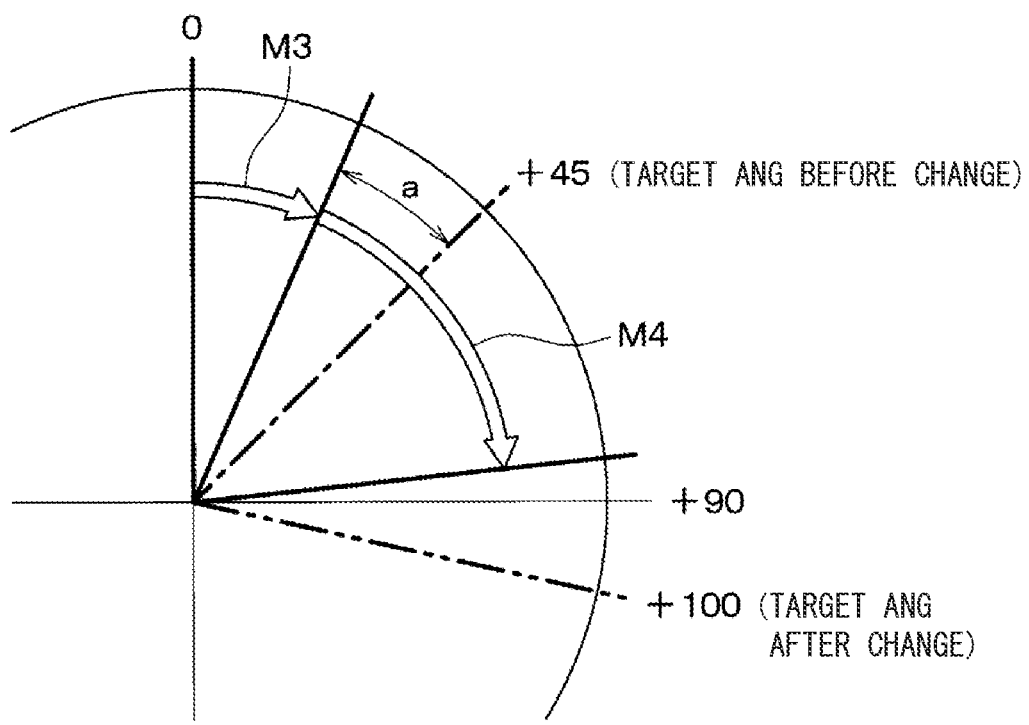
FIG. 11 is an explanatory diagram for explaining the operation of the rotating portion before and after changing the target angle in the comparative example.

FIG. 11 is a schematic diagram showing the actual operation of the rotating portion based on the control described with reference to FIGS. 10A to 10C. The arrow M3 in FIG. 11 indicates the amount of rotation of the rotating portion between the time T20 and the time T21, and the arrow M4 indicates the amount of rotation of the rotating portion between the time T21 and the time T22. As shown by the arrow M3, at the time T21, the rotating portion has not reached the initial target angle of 45 deg, and the deviation a remains. However, since the ECU of the comparative example performs the process of resetting the actual relative angle to be 0 at the time T21, the deviation between the target relative angle and the actual relative angle is 55 deg. Therefore, after the time T21, the deviation between the target relative angle and the actual relative angle gradually decreases due to the feedback control, and even if the deviation becomes 0 at the time T22, the deviation a at the time of changing the target remains between the actual angle of the rotating portion and the changed target angle of 100 deg. Therefore, as shown by the arrow M4, the rotating portion has not reached the changed target angle. In this way, in the control process executed by the ECU of the comparative example, when the target angle is changed while the rotating portion is rotating toward the initial target relative angle, the rotating portion can not reach the changed target angle. That is, in the comparative example, the deviation a when the target angle is changed cannot be absorbed by the feedback control.

Compared with the ECU of the comparative example described above, the ECU 1 of the first embodiment has the following effects.

(1) In the first embodiment, when the target angle is changed while the rotating portion is rotating toward the target relative angle before the change, the ECU 1 sets the value obtained by subtracting the "target relative angle before change" from the "actual relative angle at the time when the target angle is changed" as the actual relative angle after reset.

As a result, when the target angle is changed while the rotating portion is rotating toward the target relative angle before the change, it is possible to feedback control the actuator 2 to modify the deviation a between the actual relative angle at the time when the target angle is changed and the target relative angle before the change.

(2) Further, in the first embodiment, the ECU 1 calculates the angular velocity of the rotating portion from the amount of change in the sensor detection angle in a predetermined calculation cycle. Then, when the angular velocity is equal to or higher than the first threshold value or when the angular velocity is equal to or lower than the second threshold value, the correction is performed to bring the angular velocity closer to the normal angular velocity. Then, by integrating the angular velocity calculated in the predetermined calculation cycle and the corrected angular velocity, the actual relative angle to which the rotating portion is rotated from the rotation start angle is calculated, and the drive of the actuator 2 is feedback-controlled according to the deviation between the target relative angle and the actual relative angle.

As a result, when the output value of the sensor 7 passes through the reference position, the ECU 1 can perform correction to bring the angular velocity closer to the normal angular velocity. Then, by using the corrected angular velocity for the integration of the angular velocity, the ECU 1 can continuously and accurately calculate the actual relative angle even when the output value of the sensor 7 passes through the reference position. Therefore, the ECU 1 can continuously and accurately control the feedback of the actuator 2.

(3) Specifically, in the first embodiment, when the angular velocity is equal to or higher than the first threshold value, the ECU 1 makes a correction of subtracting 360 deg/sec from the angular velocity equal to or higher than the first threshold value. On the other hand, when the angular velocity is equal to or less than the second threshold value, the ECU 1 makes a correction of adding 360 deg/sec to the angular velocity equal to or less than the second threshold value.

As a result, when the reference position of the output value of the sensor 7 is at 360 deg, the ECU 1 can correct the angular velocity when the output value of the sensor 7 passes through the reference position to approach the normal angular velocity.

Second Embodiment

A second embodiment will be described. The second embodiment is different from the first embodiment because a part of the actuator control method executed by the ECU 1 is changed from the first embodiment and the other parts are the same as those of the first embodiment. The different part will be described only.

Figure 12:
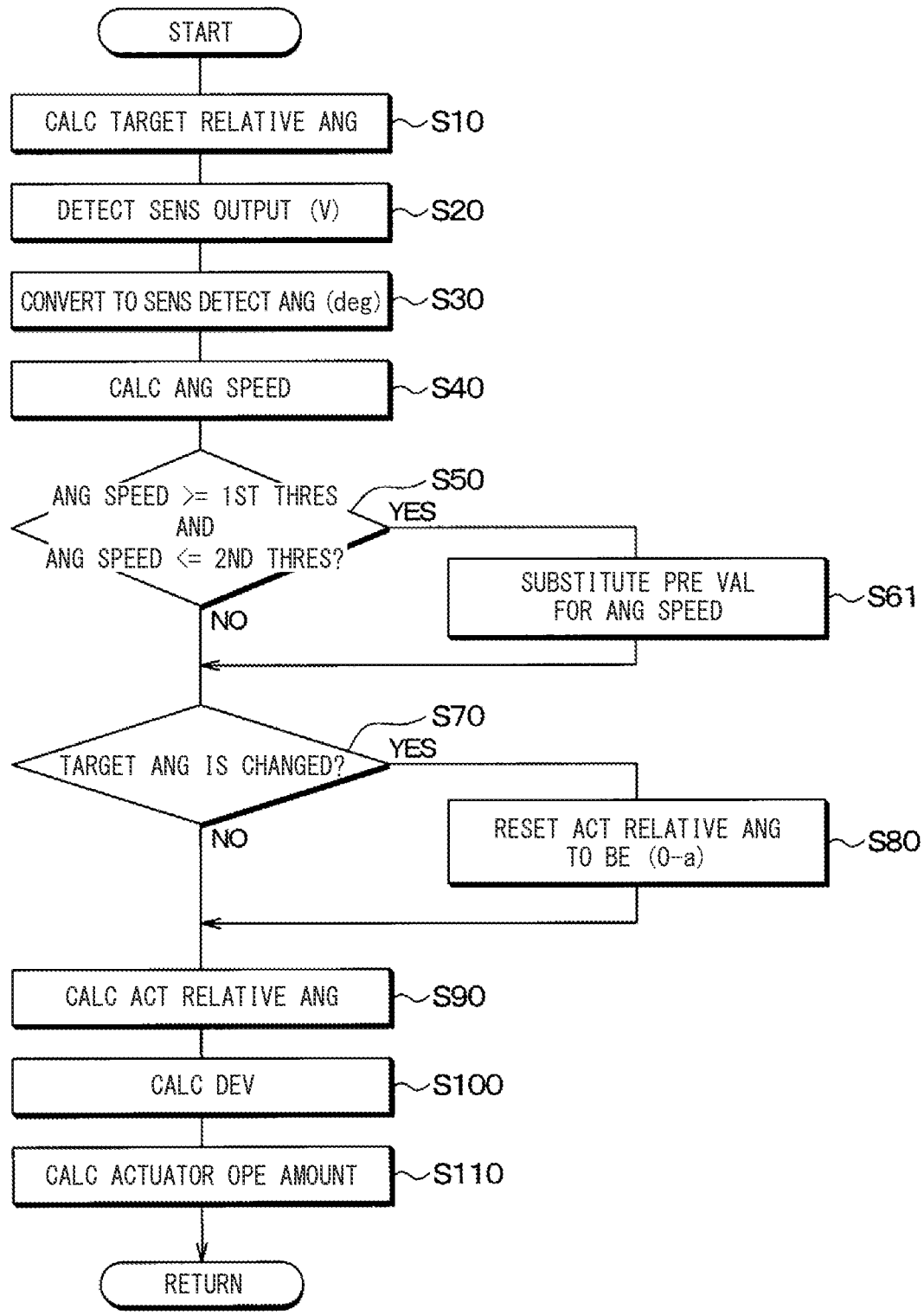
FIG. 12 is a flowchart of an actuator control method according to the second embodiment.

The actuator control method in the second embodiment is shown in the flowchart of FIG. 12. As shown in FIG. 12, in the control method of the second embodiment, the process of step S61 is different from the process described in the first embodiment. On the other hand, the processes of steps S10 to S50 and steps S70 to S110 are the same as those of the first embodiment.

In the determination of step S50 of the second embodiment, when the angular velocity is equal to or higher than the first threshold value or when the angular velocity is equal to or lower than the second threshold value (that is, when the positive determination is made in step S50), the process proceeds to step S61.

In step S61, the ECU 1 corrects the angular velocity so that it approaches the normal angular velocity. In the second embodiment, as a correction for bringing the angular velocity closer to the normal angular velocity, the ECU 1 performs a correction for changing the angular velocity to be the angular velocity calculated before one or a few the calculation cycles in which the angular velocity is lower than the first threshold value or equal to or higher than the second threshold value when the angular velocity is equal to or higher than the first threshold value or lower than the second threshold value. The angular velocity calculated before one or several calculation cycles is the angular velocity when the angular velocity is in a substantially constant state. This makes it possible to bring the angular velocity equal to or higher than the first threshold value or equal to or lower than the second threshold value closer to the normal angular velocity.

Also in the second embodiment described above, the ECU 1 can perform correction to bring the angular velocity closer to the normal angular velocity when the output value of the sensor 7 passes through the reference position.

By correcting the angular velocity in this way, the ECU 1 can executes the correction to approach the angular velocity to the normal angular velocity not only when the output value of the sensor 7 passes through the reference position but also when noise is added to the output value of the sensor 7.

Third Embodiment

A third embodiment will be described. The third embodiment is different from the first embodiment because a part of the actuator control method executed by the ECU 1 is changed from the first embodiment and the other parts are the same as those of the first embodiment. The different part will be described only.

The actuator control method according to the third embodiment will be described with reference to the flowchart of FIG. 13, the explanatory diagram of FIG. 4, and the time charts of FIGS. 15A to 15E.

Figure 13:
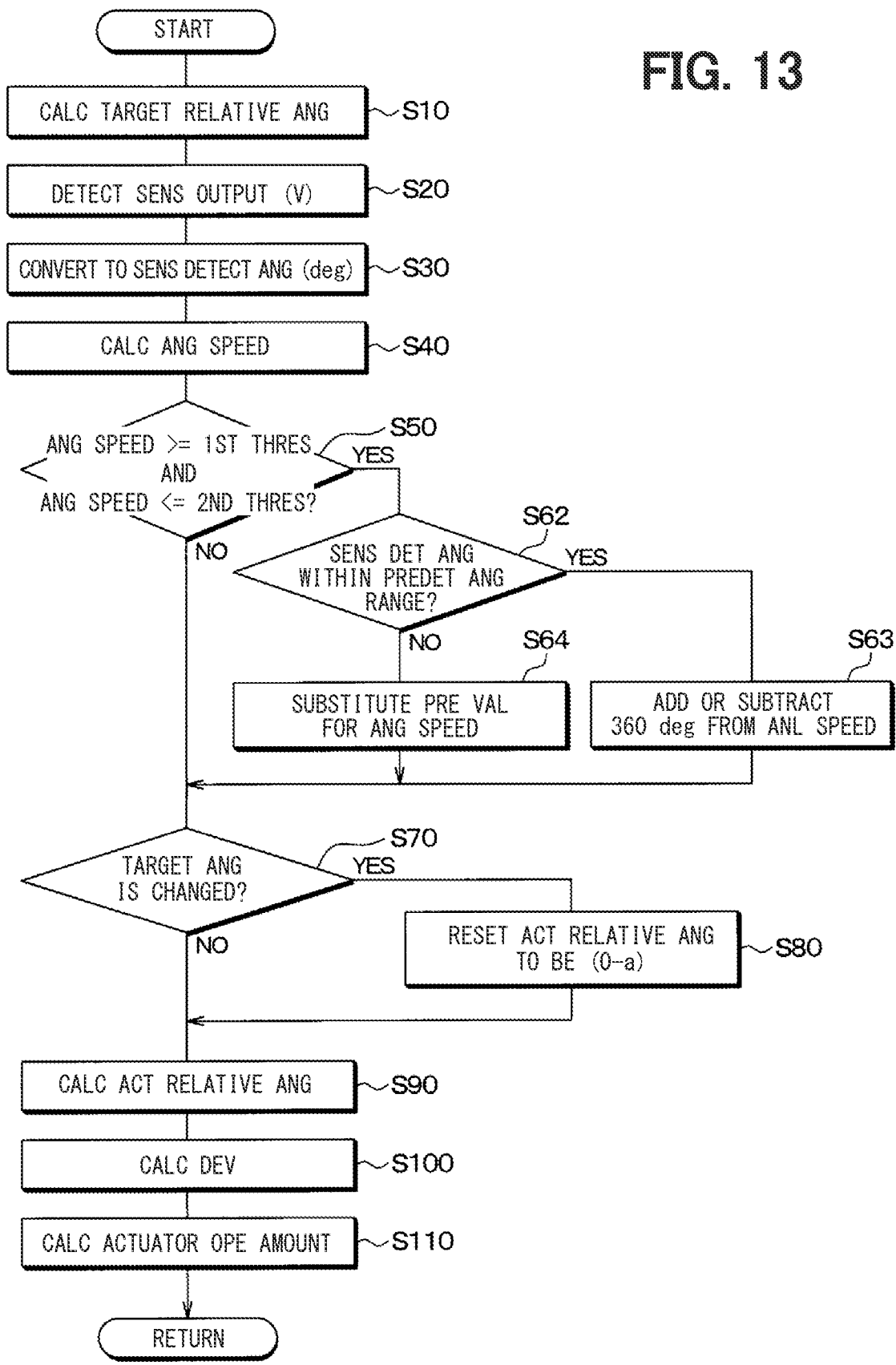
FIG. 13 is a flowchart of an actuator control method according to the third embodiment.

As shown in FIG. 13, in the control method of the third embodiment, the processes of steps S62 to S64 are different from those of the first embodiment and the like. On the other hand, the processes of steps S10 to S50 and steps S70 to S110 are the same as those of the first embodiment and the like.

In the determination of step S50 of the third embodiment, when the angular velocity is equal to or higher than the first threshold value or when the angular velocity is equal to or lower than the second threshold value (that is, when the positive determination is made in step S50), the process proceeds to step S62.

In step S62, the ECU 1 determines whether or not the sensor detection angle is within a predetermined angle range. The predetermined angle range includes an angle range in which the sensor output value has no continuity (that is, the linearity is interrupted in the ideal waveform). The predetermined angle range is also referred to as a "reference position correction range". Then, the determination in step S62 is performed by determining whether the reference position correction range flag is "1" or "0". When the reference position correction range flag is "1", the sensor detection angle is within a predetermined angle range. On the other hand, when the reference position correction range flag is "0", the sensor detection angle is not within the predetermined angle range.

Figure 14:
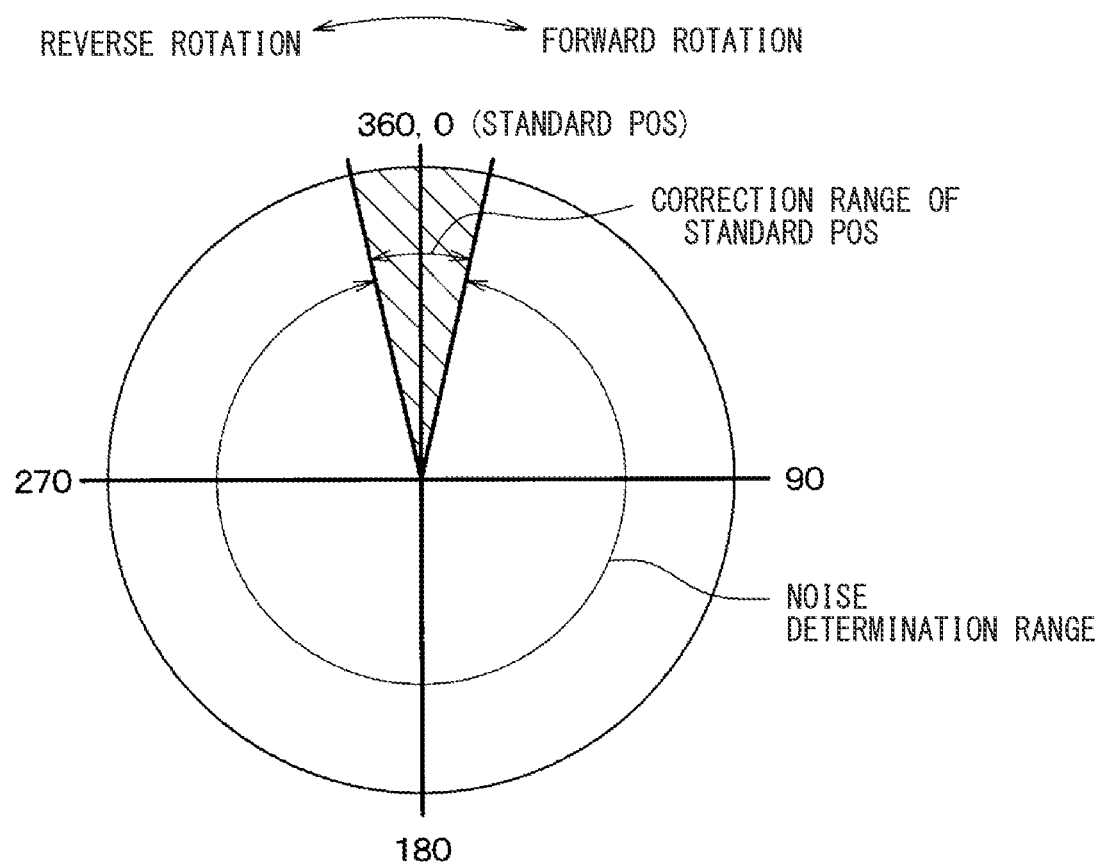
FIG. 14 is an explanatory diagram for explaining a reference position correction range and a noise determination range.

In the explanatory view of FIG. 14, hatching is added to a predetermined angle range (that is, a reference position correction range) used for the determination in step S62. When the sensor 7 whose reference position is at 0 deg (that is, 360 deg) is used, the reference position correction range is set to, for example, a range of ±5 deg of the reference position. In that case, at the time of normal rotation of the rotating portion, the sensor detection angle is 355 deg or more and the reference position correction range flag is "1", and the sensor detection angle is 5 deg or more and the reference position correction range flag is "0". On the other hand, when the rotating portion rotates in the reverse direction, the sensor detection angle is 5 deg or less and the reference position correction range flag is "1", and the sensor detection angle is 355 deg or less and the reference position correction range flag is "0". The range excluding the reference position correction range is referred to as a noise determination range.

If the reference position correction range flag is determined to be "1" (that is, the sensor detection angle is within the reference position correction range) in step S62 of FIG. 13, the process proceeds to step S63. In this case, since the sensor detection angle is within the reference position correction range, it is considered that the output value of the sensor 7 passes through the reference position.

In step S63, the ECU 1 executes the same process as the process of step S60 described in the first embodiment. That is, when the angular velocity is equal to or higher than the first threshold value, the angular velocity is corrected by subtracting 360 [deg/s]. As a result, it is possible to bring the angular velocity equal to or higher than the first threshold value closer to the normal angular velocity. On the other hand, when the angular velocity is equal to or less than the second threshold value, the angular velocity is corrected by adding 360 [deg/s]. As a result, it is possible to bring the angular velocity equal to or smaller than the second threshold value closer to the normal angular velocity.

If the reference position correction range flag is determined to be "0" (that is, the sensor detection angle is not within the reference position correction range) in step S62 of FIG. 13, the process proceeds to step S64. In this case, since the sensor detection angle is not within the reference position correction range, it is considered that noise is included in the output value of the sensor 7.

In step S64, the ECU 1 executes the same process as the process of step S61 described in the second embodiment. That is, when the angular velocity is equal to or greater than the first threshold value or equal to or less than the second threshold value, the correction is performed in place of the angular velocity calculated before the one or several calculation cycles at which the angular velocity is lower than the first threshold value or greater than the second threshold value. The angular velocity calculated before one or several calculation cycles is the angular velocity when the angular velocity is in a substantially constant state. This makes it possible to bring the angular velocity equal to or higher than the first threshold value or equal to or lower than the second threshold value closer to the normal angular velocity.

Figure 15A:
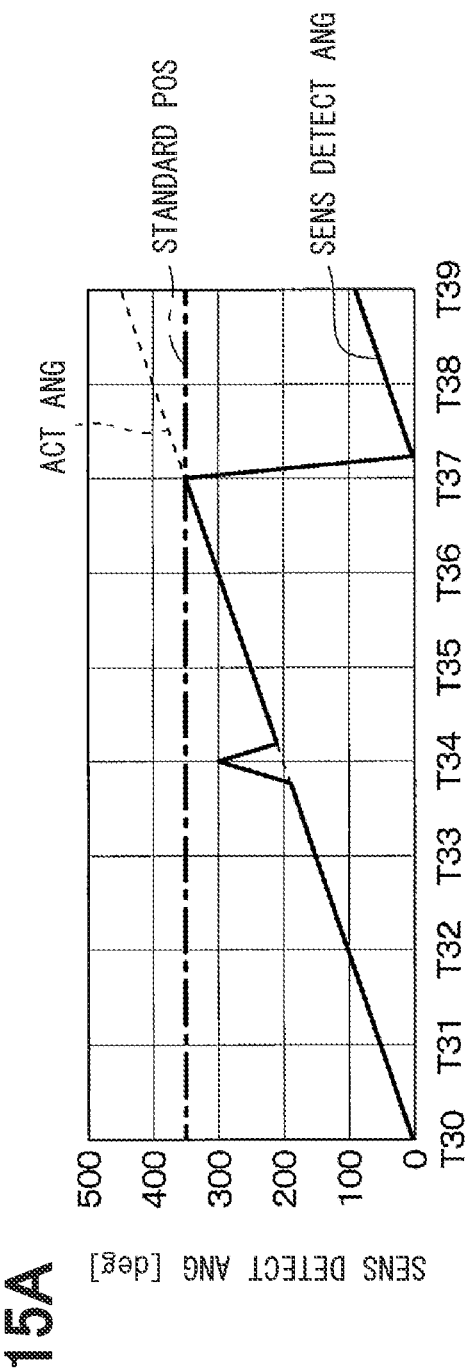
FIG. 15A is a time chart showing an actual angle of a rotating portion and a sensor detection angle.

In the time chart of FIG. 15A, the actual angle of the rotating portion is shown by a broken line, and the sensor detection angle is shown by a solid line. In addition, the reference position (that is, 360 deg) is indicated by a chain line. The actual angle of the rotating portion continuously increases from the time T30 to the time T39 as the rotating portion rotates.

On the other hand, the sensor detection angle changes abruptly near the time T34. The change around the time T34 is due to noise added to the sensor output. Further, the sensor detection angle changes from 360 deg to 0 deg near the time T37 when the output value of the sensor 7 passes through the reference position (that is, 360 deg).

Figure 15B:
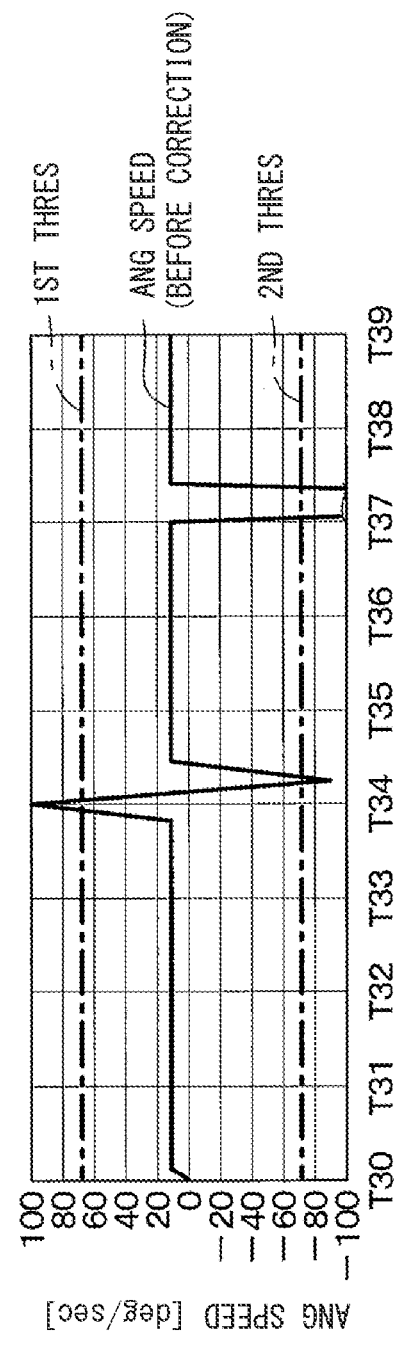
FIG. 15B is a time chart showing the angular velocity of the rotating portion calculated from the sensor detection angle.

The time chart of FIG. 15B shows the angular velocity of the rotating portion calculated by time-differentiating the amount of change in the sensor detection angle. In FIG. 15B, the angular velocity rapidly increases and decreases near the time T34, the maximum value of the angular velocity is equal to or higher than the first threshold value, and the minimum value of the angular velocity is equal to or lower than the second threshold value. Further, around time T37, the angular velocity decreases sharply, and the minimum value of the angular velocity is equal to or less than the second threshold value.

The correction described in step S63 or step S64 is performed on a part of the angular velocity shown in FIG. 15B. As shown in FIG. 15E, the reference position correction range flag is "0" near the time T34. Therefore, the correction described in step S64 is performed on the angular velocity near the time T34 in FIG. 15B. That is, the ECU 1 makes a correction in which the angular velocity of the first threshold value or more or the second threshold value or less is replaced with the angular velocity calculated before the one or several calculation cycles in which the velocity is smaller than the first threshold value or more than the second threshold value.

Further, as shown in FIG. 15E, the reference position correction range flag is "1" in the vicinity of the time T37. Therefore, the correction described in step S63 is performed on the angular velocity near the time T37 in FIG. 15B. That is, the ECU 1 corrects the angular velocity equal to or less than the second threshold value by adding 360 [deg/s].

Figure 15C:
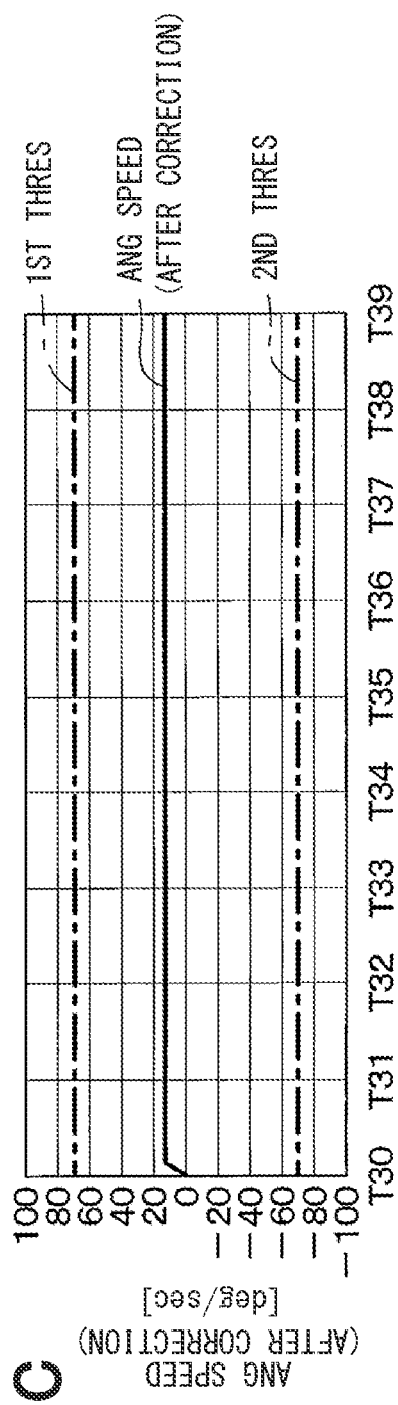
FIG. 15C is a time chart showing the corrected angular velocity.

The time chart of FIG. 15C shows the corrected angular velocity. The corrected angular velocity shows a substantially constant value from time T30 to time T39, for example, at 10 [deg/s].

Figure 15D:
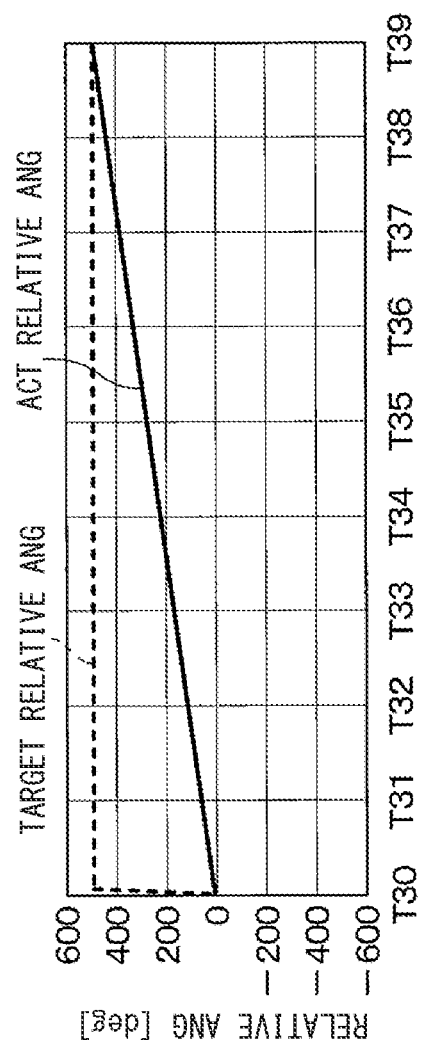
FIG. 15D is a time chart showing an actual relative angle and a target relative angle of the rotating portion.
Figure 15E:
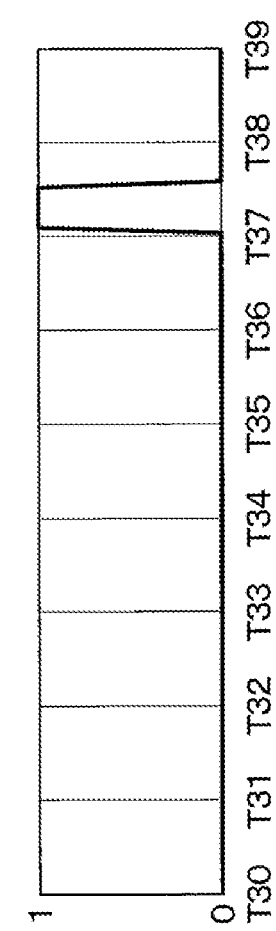
FIG. 15E is a time chart showing the operation of the reference position correction range flag.

In the time chart of FIG. 15D, the actual relative angle of the rotating portion is indicated by a solid line, and the target relative angle is indicated by a broken line. The actual relative angle of the rotating portion gradually increases from 0 deg from time T30 to time T39, and coincides with the target relative angle of 500 deg at time T39.

In the third embodiment described above, when the sensor output value has a sensor detection angle within a predetermined angle range where the sensor output values do not have continuity and the angular velocity is equal to or higher than the first threshold value, the ECU 1 corrects the angular velocity equal to or higher than the first threshold value by subtracting 360 deg. On the other hand, when the sensor output value has a sensor detection angle within a predetermined angle range in which the sensor output value does not have continuity and the angular velocity is equal to or less than the second threshold value, the ECU 1 performs a correction of adding 360 deg to the angular velocity equal to or below the second threshold value.

As a result, when the reference position of the output value of the sensor 7 is at 360 deg, the ECU 1 can correct the angular velocity when the output value of the sensor 7 passes through the reference position to approach the normal angular velocity.

On the other hand, when the sensor output value has a sensor detection angle outside a predetermined angle range in which the sensor output value does not have continuity and the angular velocity is equal to or more than the first threshold value or equal to or less than the second threshold value, the ECU 1 performs the correction to substitute the angular velocity with the angular velocity calculated before the one or several calculation cycles in which the velocity is smaller than the first threshold value or larger than the second threshold value.

As a result, when the output value of the sensor 7 contains noise, it is possible to correct the angular velocity at that time to approach the normal angular velocity.

Fourth Embodiment

A fourth embodiment will be described. In the fourth embodiment, a part of the configurations with the ECU 1 is changed with respect to the first embodiment, and the other parts are similar to that in the first embodiment, so only the difference from the first embodiment will be described.

Figure 16:
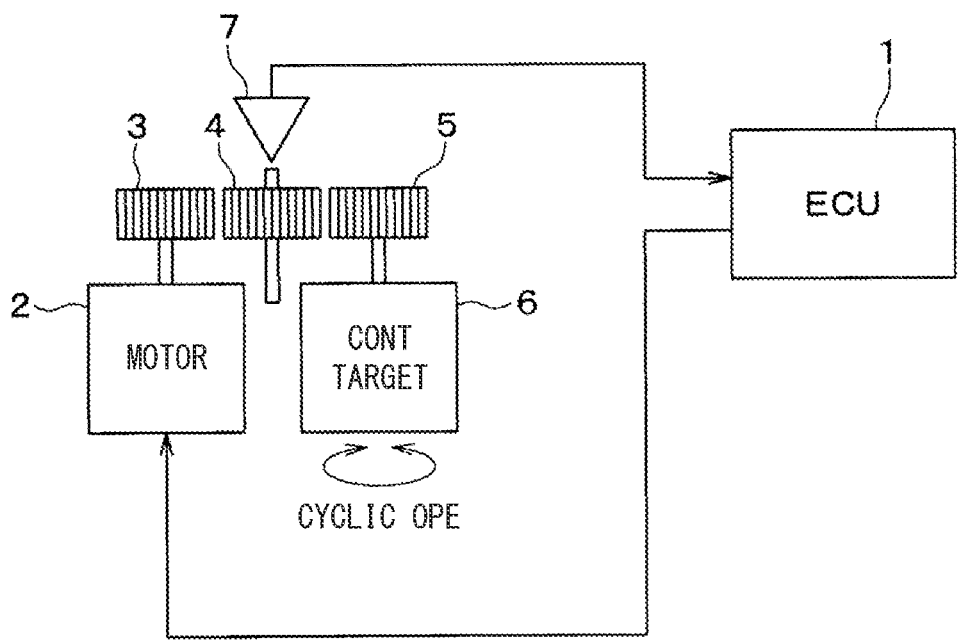
FIG. 16 is a system configuration diagram including an actuator control device according to the fourth embodiment.

As shown in FIG. 16, in the fourth embodiment, the angle of the intermediate gear 4 is detected by the sensor 7. In the fourth embodiment, the intermediate gear 4 corresponds to an example of the "rotating portion". The intermediate gear 4 also rotates 360 deg or more. The ECU 1 can control the drive of the actuator 2 according to the angle of the intermediate gear 4.

When this system is applied to, for example, drive control of a shift drum of a vehicle transmission system, it may be difficult to arrange the sensor 7 in the output gear 5 due to restrictions on vehicle mounting. Even in such a case, in the fourth embodiment, the mounting restriction can be relaxed by arranging the sensor 7 in the intermediate gear 4.

When the sensor 7 is arranged in the intermediate gear 4, the sensor detection angle when operating the control object at the same angle becomes larger in proportion to the reduction ratio of the gear, as compared with the case where the sensor 7 is arranged in the output gear 5. Therefore, since the resolution is increased, the feedback control of the actuator 2 can be performed more accurately.

Other Embodiments (1) In each of the above embodiments, the shift drum used in the transmission of the vehicle is described as the control target 6, but the control target 6 is not limited to this, and various targets that rotate by 360 deg or more may be applied.

(2) In each of the above embodiments, the sensor 7 has a magnetic field formation unit 8 including two magnets and two yokes, and a magnetic field detection unit 9 provided inside the magnetic field formation unit 8. However, it is not limited to this. As the sensor 7, any sensor 7 having various configurations including the one described in the conceivable sensor may be adopted as long as it can detect the angle of the rotating portion.

(3) In each of the above embodiments, the sensor 7 detects the angle of the output gear 5 or the intermediate gear 4, but it is not limited to this, and the sensor 7 may detect the angle of the motor gear 3, for example. In that case, the motor gear 3 corresponds to an example of the "rotating portion".

(4) In each of the above embodiments, PI control has been described as an example of feedback control executed by the ECU 1, but the feedback control is not limited to this, and various methods such as PID control or P control may be adopted.

The present disclosure is not limited to the above-described embodiments and may be appropriately modified. The embodiments described above are not independent of each other, and can be appropriately combined except when the combination is obviously impossible. Individual elements or features of a particular embodiment are not necessarily essential unless it is specifically stated that the elements or the features are essential in the foregoing description, or unless the elements or the features are obviously essential in principle. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. Further, in each of the embodiments described above, when referring to the shape, positional relationship, and the like of the components and the like, it is not limited to the shape, positional relationship, and the like, except for the case where the components are specifically specified, the case where the components are fundamentally limited to a specific shape, positional relationship, and the like.

The control apparatus and the technique according to the present disclosure may be achieved by a dedicated computer provided by constituting a processor and a memory programmed to execute one or more functions embodied by a computer program. Alternatively, the control apparatus and the technique according to the present disclosure may be achieved by a dedicated computer provided by constituting a processor with one or more dedicated hardware logic circuits. Alternatively, the control unit and the method thereof described in the present disclosure are based on a combination of a processor and a memory programmed to execute one or more functions and a processor configured by one or more hardware logic circuits. It may be realized by one or more configured dedicated computers. The computer programs may be stored, as instructions to be executed by a computer, in a tangible non-transitory computer-readable storage medium.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An actuator control device that controls a drive of an actuator according to an angle of a rotating portion rotatable 360 deg or more and driven by the actuator, the actuator control device comprising:
   a processor configured to:
   calculate a target relative angle for rotating the rotating portion from a rotation start angle to a target angle;
   detect a sensor detection angle as an absolute angle of the rotating portion by signal-processing an output value from a sensor that outputs an output signal corresponding to the angle of the rotating portion;
   calculate an angular velocity of the rotating portion based on a change amount of the sensor detection angle in a predetermined calculation cycle;
   correct the angular velocity to be closer to a normal angular velocity when the angular velocity is greater than or equal to a first threshold smaller than 360 deg/sec and larger than zero deg/sec, or when the angular velocity is less than or equal to a second threshold smaller than 0 deg/sec and greater than −360 deg/sec;
   calculate an actual relative angle to which the rotating portion is rotated from the rotation start angle by integrating the angular velocity calculated in the predetermined calculation cycle and a corrected angular velocity; and
   feedback-control the drive of the actuator according to a deviation between a target relative angle and the actual relative angle.

2. The actuator control device according to claim 1, wherein the processor is configured to:
   correct the angular velocity by subtracting 360 deg/sec from the angular velocity when the angular velocity is equal to or greater than the first threshold; and
   correct the angular velocity by adding 360 deg/sec to the angular velocity when the angular velocity is equal to or less than the second threshold.

3. The actuator control device according to claim 1, wherein the processor is configured to:
   correct the angular velocity by substituting the angular velocity with another angular velocity calculated before one or several calculation cycles in which the angular velocity is less than the first threshold or greater than the second threshold when the angular velocity is equal to or greater than the first threshold or equal to or less than the second threshold.

4. The actuator control device according to claim 1, wherein the processor is configured to:
   calculate the target relative angle as the deviation between the target angle before the target angle is changed and the target angle after the target angle is changed;
   reset the actual relative angle when the target angle is changed; and
   set a value, obtained by subtracting the target relative angle before the target angle is changed from the actual relative angle when the target angle is changed, as the actual relative angle after resetting the actual relative angle in a case where the target angle is changed while the rotating part is rotating toward the target relative angle before the target angle is changed.

5. The actuator control device according to claim 1, wherein the processor is configured to:
   correct the angular velocity by subtracting 360 deg/sec from the angular velocity when the angular velocity is equal to or greater than the first threshold, and the sensor detection angle is disposed within a predetermined angle range in which the output value from the sensor does not have continuity;
   correct the angular velocity by adding 360 deg/sec to the angular velocity when the angular velocity is equal to or less than the second threshold, and the sensor detection angle is disposed within a predetermined angle range in which the output value from the sensor does not have continuity; and
   correct the angular velocity by substituting the angular velocity with another angular velocity calculated before one or several calculation cycles in which the angular velocity is less than the first threshold or greater than the second threshold when the angular velocity is equal to or greater than the first threshold or equal to or less than the second threshold, and the sensor detection angle is disposed out of a predetermined angle range in which the output value from the sensor does not have continuity.

6. An actuator control method for controlling a drive of an actuator according to an angle of a rotating portion rotatable 360 deg or more and driven by the actuator, the actuator control method comprising:
   calculate a target relative angle for rotating the rotating portion from a rotation start angle to a target angle;
   detect a sensor detection angle as an absolute angle of the rotating portion by signal-processing an output value from a sensor that outputs an output signal corresponding to the angle of the rotating portion;
   calculate an angular velocity of the rotating portion based on a change amount of the sensor detection angle in a predetermined calculation cycle;
   correct the angular velocity to be closer to a normal angular velocity when the angular velocity is greater than or equal to a first threshold smaller than 360 deg/sec and larger than zero deg/sec, or when the angular velocity is less than or equal to a second threshold smaller than 0 deg/sec and greater than −360 deg/sec;

calculate an actual relative angle to which the rotating portion is rotated from the rotation start angle by integrating the angular velocity calculated in the predetermined calculation cycle and a corrected angular velocity; and feedback-control the drive of the actuator according to a deviation between a target relative angle and the actual relative angle.

\* \* \* \* \*